July 11, 1950 P. S. SMITH 2,514,611
STRIP-FORMING AND FEEDING APPARATUS
Filed March 5, 1948 11 Sheets-Sheet 2

INVENTOR.
PAUL S. SMITH
BY
HIS ATTORNEYS

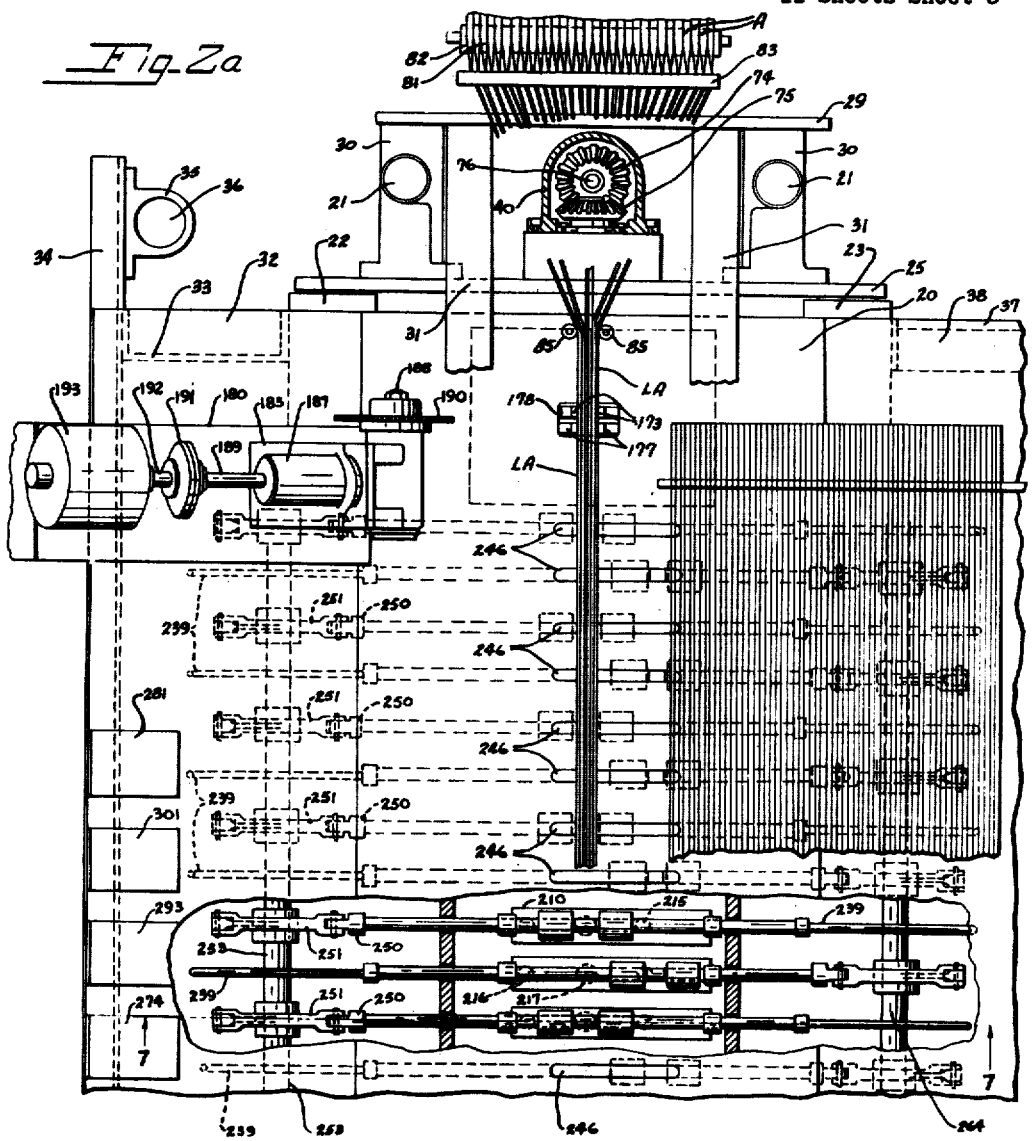

July 11, 1950 P. S. SMITH 2,514,611
STRIP-FORMING AND FEEDING APPARATUS
Filed March 5, 1948 11 Sheets-Sheet 4
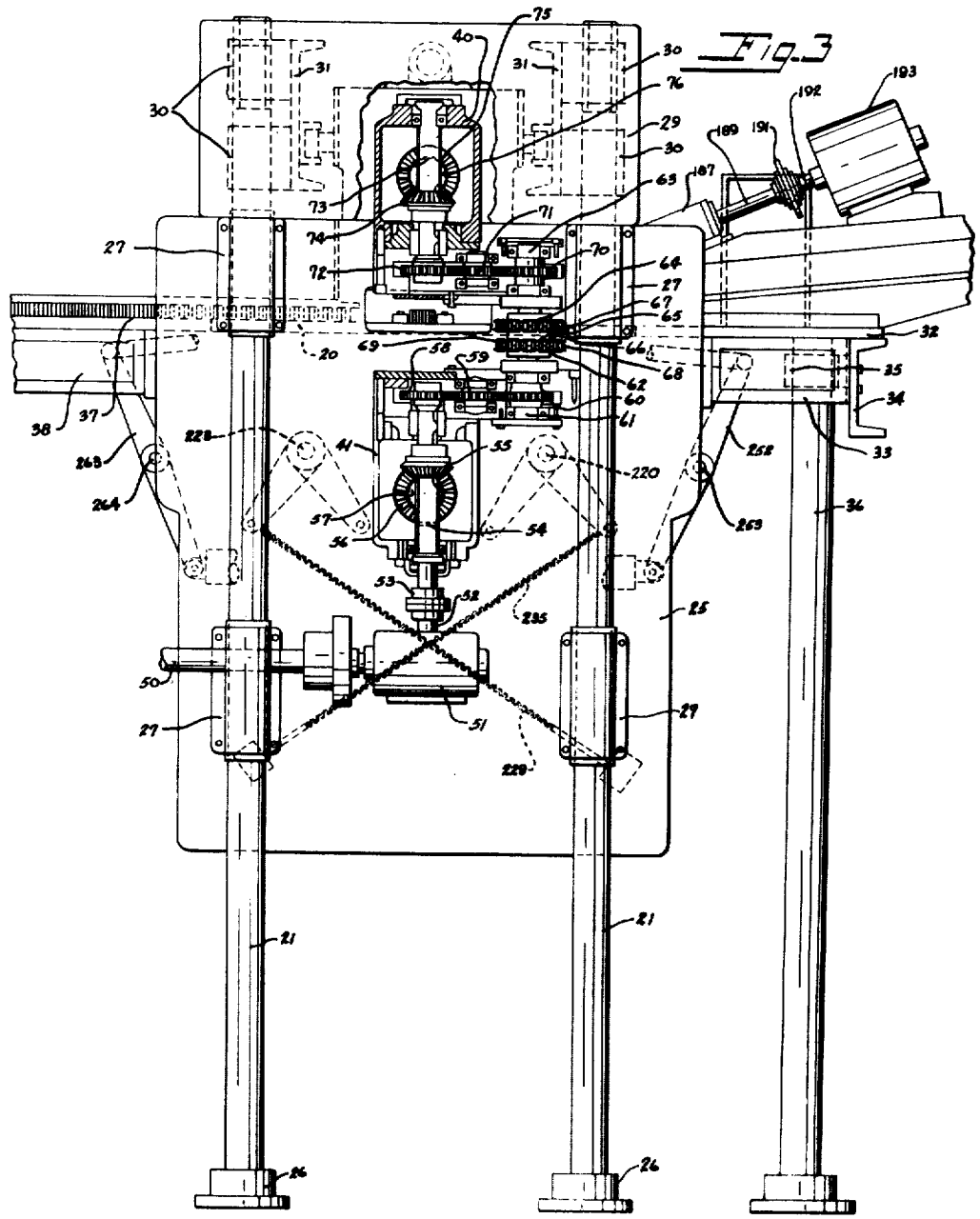
INVENTOR.
PAUL S. SMITH
BY
HIS ATTORNEYS July 11, 1950 P. S. SMITH 2,514,611
STRIP-FORMING AND FEEDING APPARATUS
Filed March 5, 1948 11 Sheets-Sheet 5
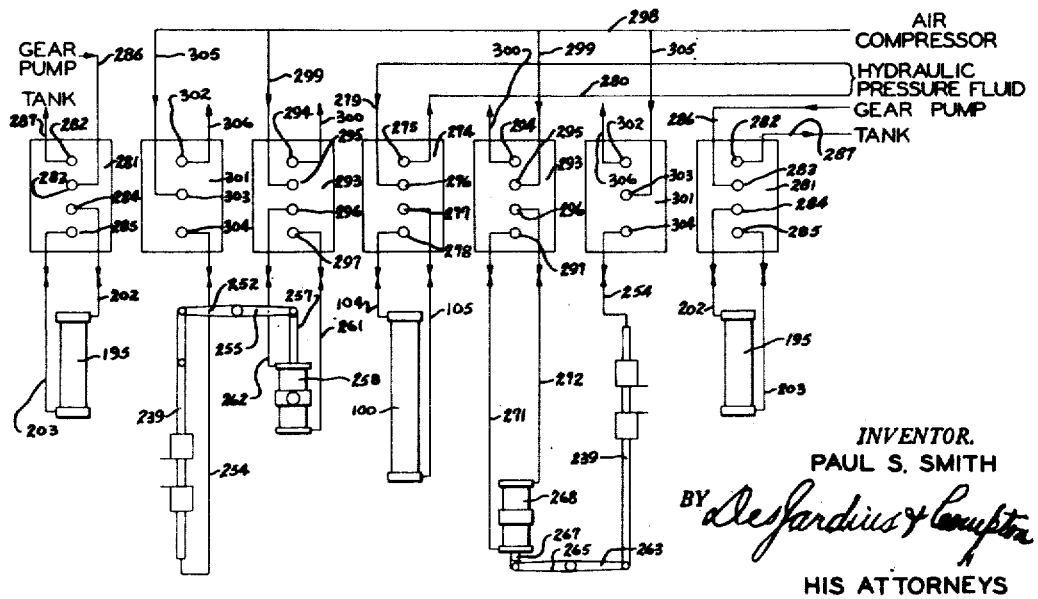
INVENTOR.
PAUL S. SMITH
BY Desjardins & Compton
HIS ATTORNEYS

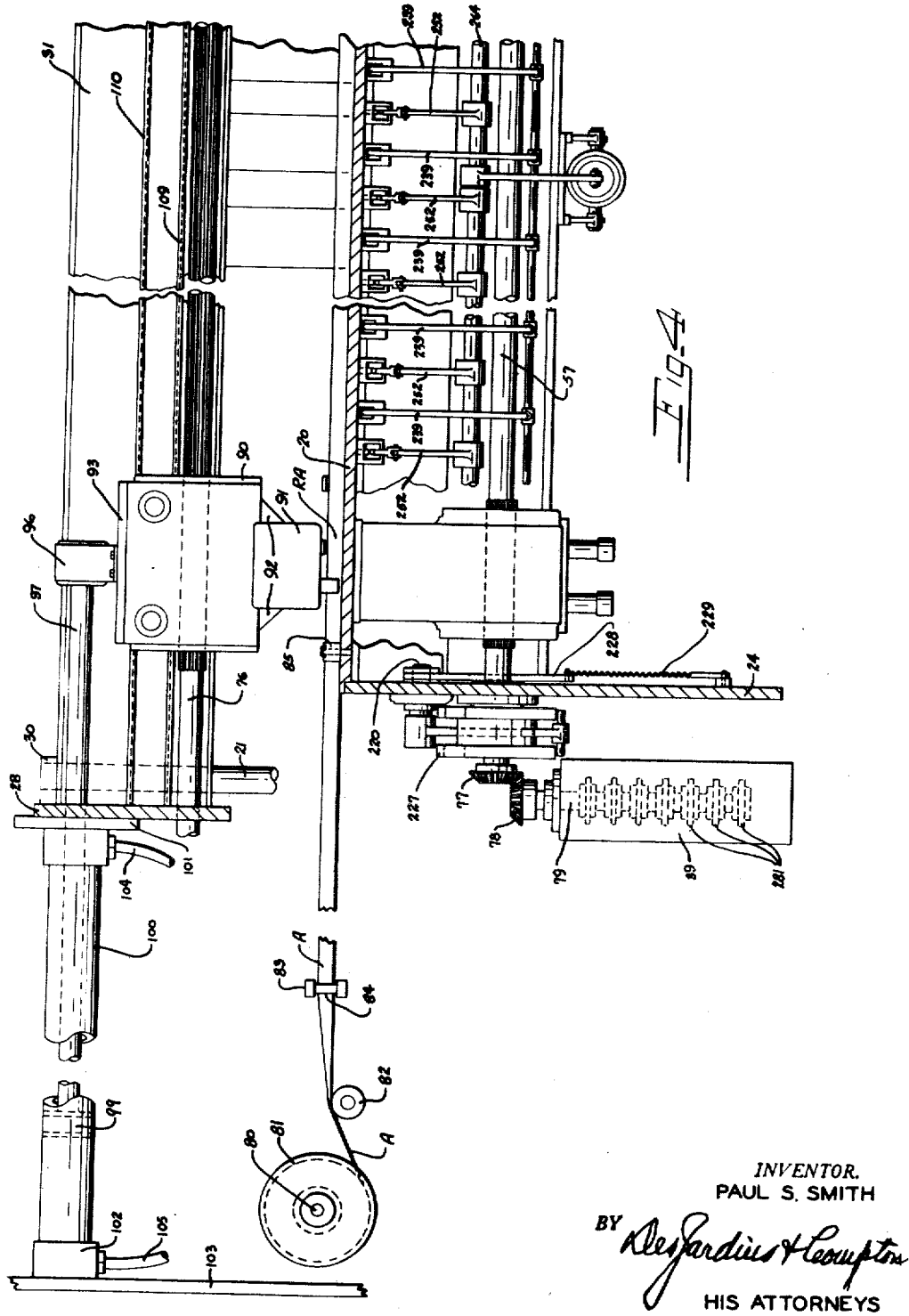

INVENTOR.
PAUL S. SMITH

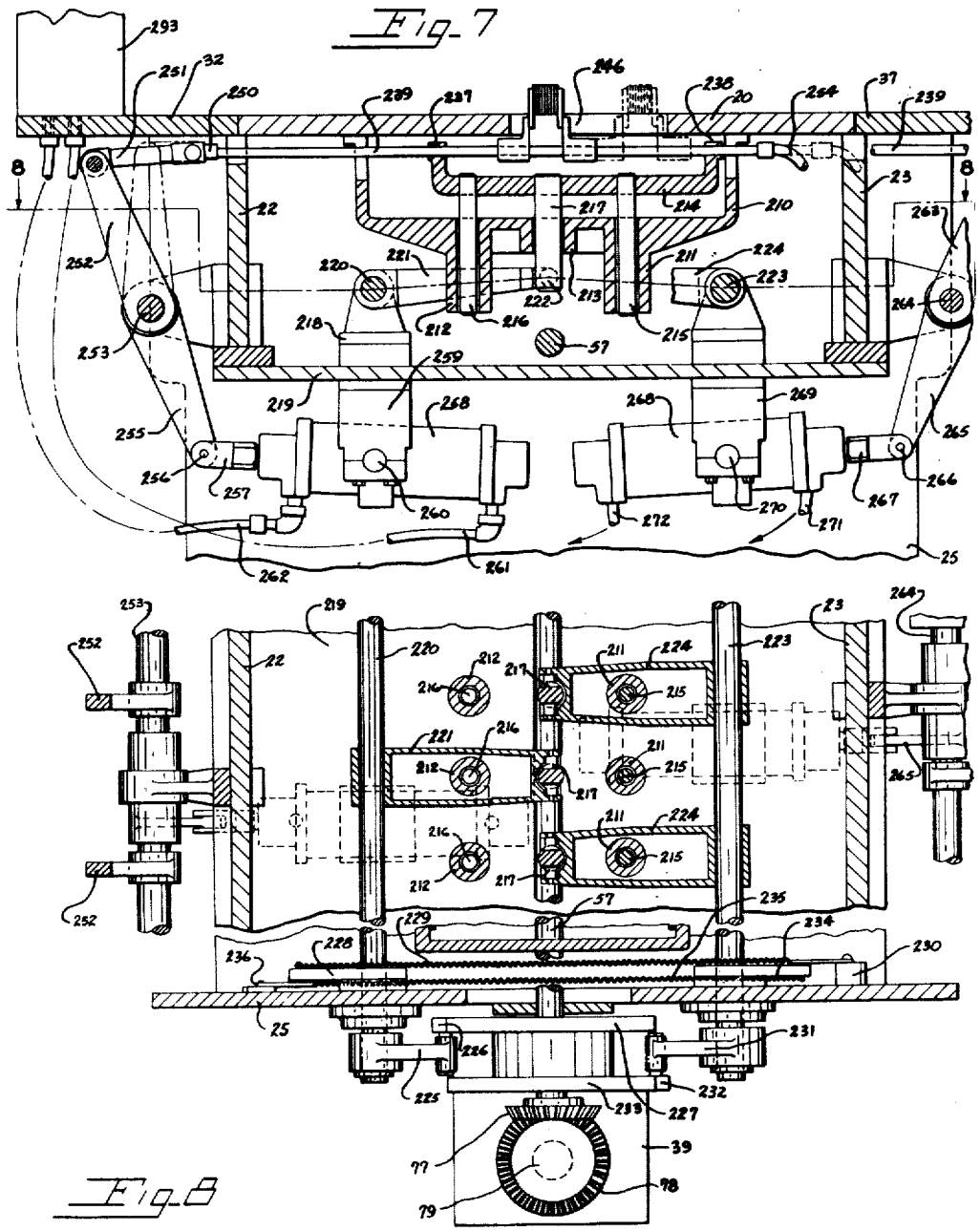

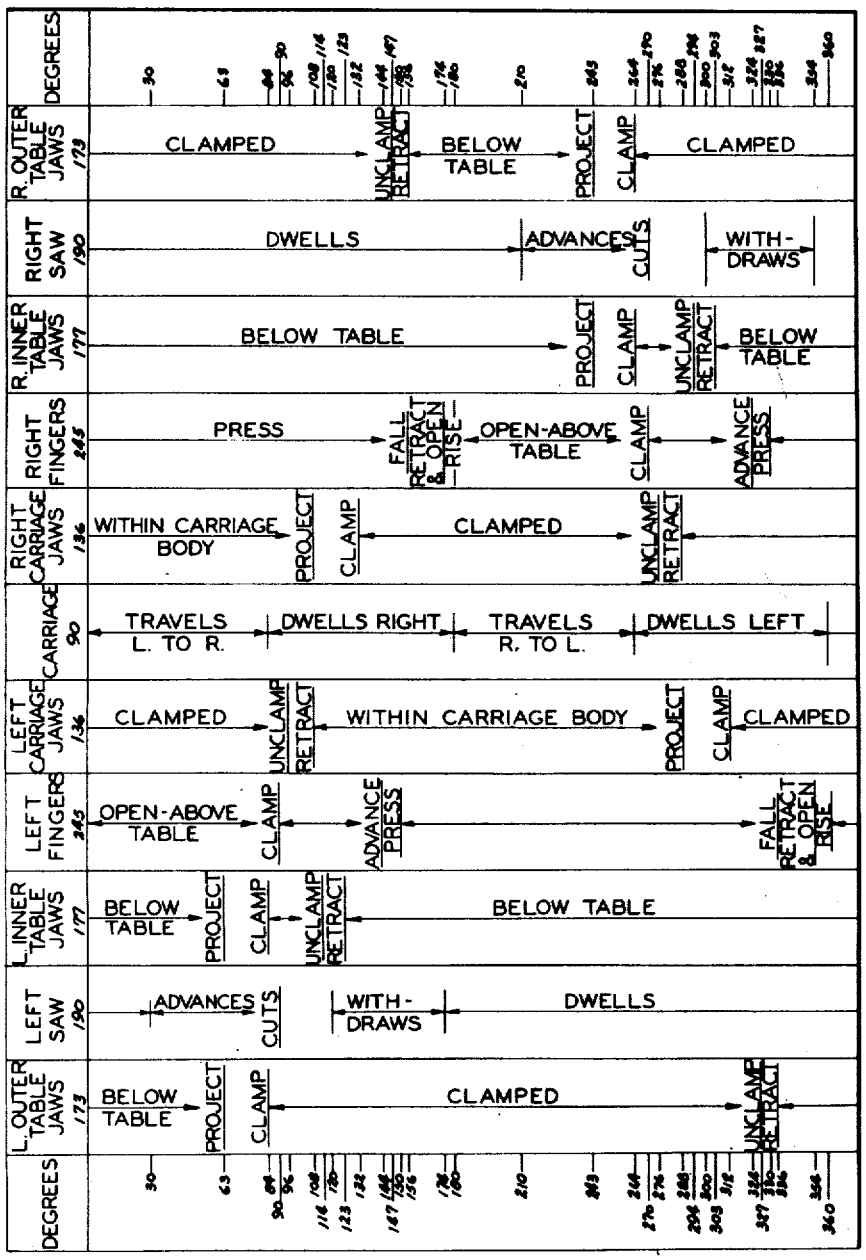

July 11, 1950            P. S. SMITH            2,514,611
STRIP-FORMING AND FEEDING APPARATUS
Filed March 5, 1948            11 Sheets—Sheet 11
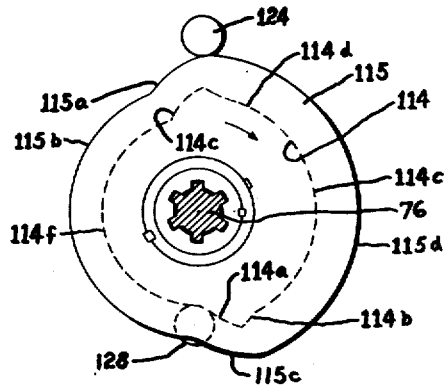
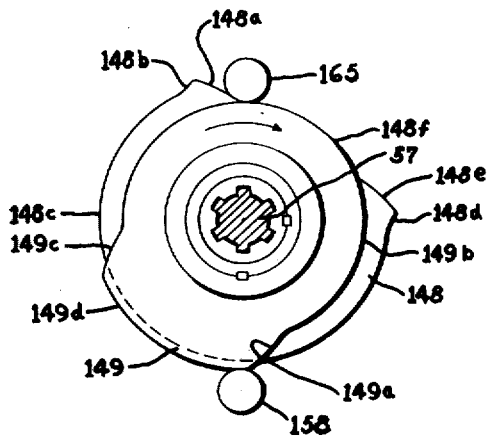
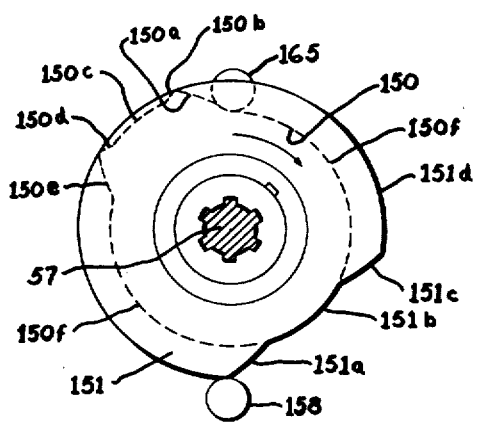
INVENTOR.
PAUL S. SMITH
BY *Desjardins & Compton*
HIS ATTORNEYS Patented July 11, 1950

2,514,611

UNITED STATES PATENT OFFICE 2,514,611

STRIP-FORMING AND FEEDING APPARATUS

Paul S. Smith, Carlisle, Pa., assignor to Ellen Bertha Allen, Summit, N. J.

Application March 5, 1948, Serial No. 13,303

112 Claims. (Cl. 164—62)

My invention relates to an improved strip-forming and feeding apparatus and has to do, more particularly, with a machine for continuously cutting strips of predetermined length from tapes of predetermined width, of chipboard or like material, so as to form and feed continuously a supply of said strips to a magazine, which may form a part of an apparatus in which said strips are used.

The principal object of my invention is to provide a machine or apparatus that will operate at high speed to form strips of chipboard or like material, of predetermined width and length, and to feed said strips continuously to a magazine.

It is an object of my invention to provide an apparatus for keeping filled, with severable separator strips, the magazine of a machine for making cemented pile fabric, of the character shown in United States Letters Patent No. 2,302,-722 for Apparatus for Making Cemented Pile Fabric, patented November 24, 1942, on my application, and in my pending application for Apparatus for Making Cemented Pile Fabric, Serial No. 691,795, filed August 20, 1946, now Patent No. 2,497,330, issued February 14, 1950. The machine, illustrated in that patent and application, makes use of severable separator strips, which may be of chipboard or like material, and which must be of predetermined width and length, and such machine uses up such separator strips rapidly. One of the chief objects of my invention, therefore, is to provide an apparatus that will keep the magazine of such a machine filled with a supply of severable separator strips. The machine for making cemented pile fabric shown in said patent, and in said application, employs two magazines, one on each side of the machine. The apparatus shown in the present application is for the purpose of supplying strips to one of these magazines only. A like apparatus will be provided for feeding strips to the opposite magazine.

It is another object of my invention to provide an apparatus capable of drawing tapes from coils of tape, cutting said tapes to length to form strips, and feeding continuously such strips to a magazine, from which they may be drawn for use as needed.

Further objects, and objects relating to details of construction and economies of operation, will definitely appear from the detailed description to follow. My invention is clearly defined and pointed out in the appended claims. A structure constituting a preferred embodiment of my invention is illustrated in the accompanying drawings, forming a part of this specification, in which:

Fig. 1 is a view in right side elevation of a strip-forming and feeding apparatus embodying my invention, portions being broken away to show parts behind them.

Fig. 2 and 2a, taken together, constitute a top plan view of the apparatus, portions being broken away to show parts located below them.

Fig. 3 is a view in side elevation to the left side of the apparatus, partly in section.

Fig. 3a is a view in side elevation of one of the saw units, shown with the saw in cutting position in full lines and, in dotted lines, in the retracted position.

Fig. 4 is a vertical, sectional, fragmentary view of the right side of the apparatus, taken on the line 4—4 of Fig. 2.

Fig. 7 is a fragmentary, vertical, sectional view taken on the line 7—7 of Fig. 2a, showing the operating devices for the strip-feeding fingers.

Fig. 8 is a fragmentary, horizontal, sectional view, taken on the line 8—8 of Fig. 7.

Fig. 9 is a timing chart for the machine.

Fig. 10 is a detail view, partly in side elevation and partly in section, showing the mounting of a pair of strip-feeding fingers.

Fig. 11 is a diagram showing the fluid pressure connections to and from a series of valves for controlling application of fluid pressure at various points of the cycle.

Fig. 12 is a view in side elevation of the cams for controlling a pair of carriage jaws.

Fig. 13 is a view in side elevation of the cams for controlling a pair of outer table jaws, and Fig. 14 is a view in side elevation of the cams for controlling a pair of inner table jaws.

In the drawings, the same reference numerals refer to the same parts throughout the several views, and the sectional views are taken looking in the direction of the arrows at the ends of the section lines.

Figure 1:
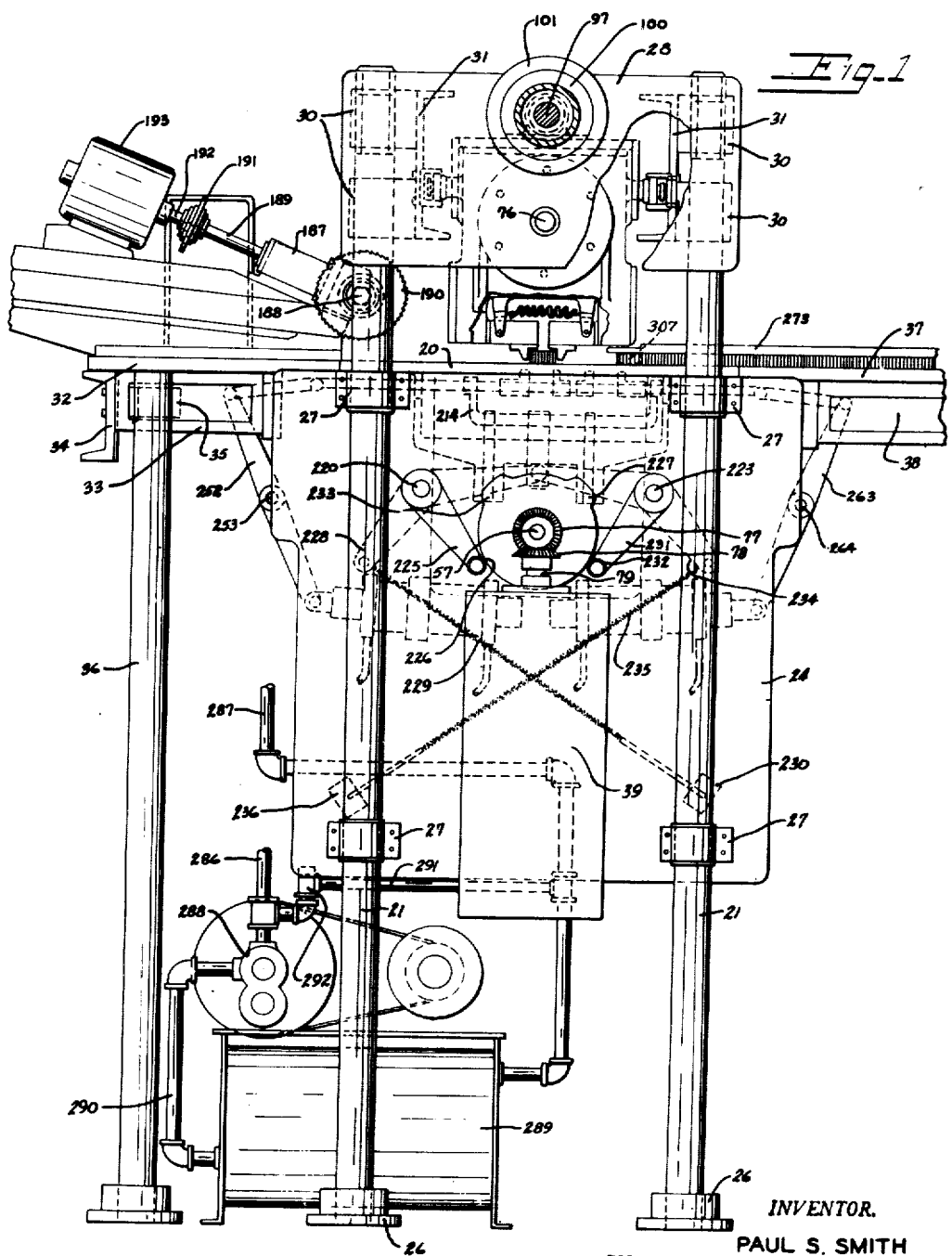

In general, the strip-forming and feeding apparatus of my invention comprises a suitably supported table, a support at one side of the table, on which a plurality of coils of chipboard tape may be mounted side by side to turn about a common axis, means for gathering the tapes from said coils into a tape bundle, in which each tape is disposed edgewise on the surface of the table, means for drawing the tape bundle lengthwise across the table from side to side, means for severing a portion of the tape bundle to form a strip bundle, and means for moving the strip bundle on the table, in a direction at right angles to the length of the bundle, to feed it to a magazine. The means for drawing the tape bundle across the table may include a carriage having bundle-gripping means, and means for causing the carriage to move across the table from side to side. These bundle-gripping means are caused automatically to grip and release a tape bundle at predetermined points of the cycle of operation, and are raised and lowered at predetermined points of the cycle. The apparatus may include, also, means, such as a pair of outer table jaws, for gripping the tape bundle and holding it stationary during certain portions of the cycle, and these table jaws are so controlled that they release the tape bundle, while it is being drawn across the table, and grip it during the return movement of the carriage and until the bundle-gripping means on the carriage have again gripped the tape bundle. The apparatus may include, also, means, such as a pair of inner table jaws, mounted adjacent the outer table jaws and so controlled that both the outer and inner jaws will grip the tape bundle while the severing means act to sever a portion of the tape bundle to form a strip bundle. The severing means will act to cut the tape bundle between the outer and inner jaws.

Preferably, this strip-forming and feeding apparatus will include two supports, one at the right and the other at the left side of the table, on each of which supports a plurality of coils of chipboard tape may be mounted side by side for rotation about a common axis, and means, at each side of the table, for gathering tapes, from the coils at that side of the table, into a tape bundle. Means will be provided to draw the left tape bundle from left to right across the table and, then, to draw the right tape bundle from right to left across the table. The severing means will be such as to cut off a portion of each tape bundle to form a strip bundle, and the means for moving the strip bundle on the table will act to move a strip bundle cut from the left tape bundle laterally before the right tape bundle is drawn across the table. The severing means will act, also, to cut a portion from the right tape bundle to form another strip bundle, which is also moved laterally.

Referring to the numbered parts of the drawings, the machine has a rectangular table 20 (Figs. 1, 2, 2a and 3), extending horizontally between four vertical posts 21 and supported on beams 22 and 23 extending from one side of the machine to the other between opposite posts 21 and fastened to end plates 24 and 25, which have brackets 27 fastened thereto, which brackets receive and are pinned to the posts 21. The latter are provided with flanged feet 26 resting on a suitable floor. Posts 21 also support endplates 28 and 29, by means of brackets 30 which also support the channel beams 31, extending parallel to each other from one side of the machine to the other, between the endplates 28 and 29. An extension 32 of the table 20 is supported by the beams 33, one at each side of the machine, and the transverse beam 34, to the ends of which flanged brackets 35 are bolted, which are pinned to supporting posts 36. An extension 37 of the table 20 is supported in a similar manner on beams 38, and this table extension 37 lies adjacent to and at the same level as the floor of the magazine of the machine for making cemented pile fabric, in which the strips produced in this apparatus are used, so that said strips will be fed from the table 20 over the table extension 37 to the magazine of said machine. The housing 39 of a cam switch is supported on endplate 24 and, similarly, gear housings 40 and 41 are supported on endplates 29 and 25.

Driving mechanism

The main drive shaft 50 (Fig. 3) is driven from a suitable source of power, in timed relation with the machine for making cemented pile fabric to which the strips formed in the present apparatus are delivered for use. Shaft 50 drives a gear reducer 51, the output shaft 52 of which is connected by the flexible coupling 53 to the vertical shaft 54, which is suitably journaled in the gear casing 41. Bevel gear 55 is fixed to shaft 54 and meshes with a bevel gear 56 fast on the end of a shaft 57, extending from one side of the machine to the other below the table and suitably journaled in the endplates 24 and 25. As will appear later, shaft 57 is externally splined over portions of its length. Gear 58, fixed on the upper end of shaft 54, meshes with an idler gear 59 on a stub shaft suitably journaled in the casing 41, and gear 59 meshes with a gear 60 fixed to a vertical shaft 61, likewise journaled in gear casing 41. A sprocket 62 is fast on the upper end of shaft 61. A vertical shaft 63 is arranged in axial alignment with the shaft 61, being journaled in suitable bearings in gear casing 40, and a sprocket 64 is fixed on the lower end of shaft 63. A sleeve 65 is journaled on the adjacent ends of shafts 61 and 63 and has fixed to its lower end a sprocket 66, lying alongside, and having the same number of teeth as, sprocket 62. An endless sprocket chain 68 extends circumferentially around sprockets 62 and 66 and meshes with the teeth thereof, so that sleeve 65 is caused to turn with shaft 61. On the upper end of sleeve 65, there is fixed a sprocket 67, which lies alongside, and has the same number of teeth as, the sprocket 64, the number of teeth on each of sprockets 64 and 67 being one less than the number of teeth on sprockets 62 and 66. An endless sprocket chain 69 extends circumferentially around sprockets 64 and 67 engaging the teeth thereof, so that shaft 63 is caused to turn with sleeve 65 and shaft 61. The sprockets 62, 66, 67 and 64, and the sprocket chains 68 and 69 surrounding them, constitute a flexible coupling between shaft 61 and shaft 63 and the timing of shaft 63 with reference to shaft 61 may be varied by removing one of the sprocket chains 68 and 69, and turning one of the sprockets with respect to its companion.

Gear 70 is fixed on shaft 63 and meshes with an idler gear 71, fixed on a stub shaft suitably journaled in the gear casing 40. Idler gear 71 also meshes with a gear 72 on the lower end of vertical shaft 73, which is likewise journaled in the gear casing 40. A bevel gear 74 is fixed on shaft 73 and meshes with a bevel gear 75 fast on one end of a shaft 76, which extends from one side of the machine to the other, above the table, and is suitably journaled in the endplates 28 and 29. Shaft 76 is externally splined throughout the greater portion of its length.

On the right side of the machine (Fig. 1), a bevel gear 77 is fixed on the end of shaft 57 and meshes with a bevel gear 78 fast on the upper end of cam switch shaft 79, which is housed in the casing 39.

Tape-gathering means

At each side of the machine frame (Figs. 2 and 2a), there is provided a mandrel 80 supported by the frame, and a plurality of coils 81 of chipboard tape are mounted on each of these mandrels to turn about a common horizontal axis. The tapes A from these coils pass over an idler roller 82, mounted to turn about a horizontal axis and located at such height as to deflect a sheet of tapes coming from coils 81 into the horizontal plane of the top of table 20. The tapes A then pass through a reed 83, which is provided with a plurality of spaced vertical rolls 84 (Fig. 4), the distance between each two adjacent rolls slightly exceeding the thickness of the tape. Each tape A, after passing over the roller 82, passes between a pair of the rolls 84, the tape having first been given a quarter turn, so that it is presented edgewise to the horizontal plane of the table top. The tapes A are condensed into a tape bundle and pass between a pair of vertical guide rolls 85, so that the tapes coming from the coils at one side of the table are condensed or gathered into a tape bundle. The tape bundle formed from tapes A from coils 81 at the right side of the table is designated RA, and that formed from the tapes A coming from coils 81 at the left side of the table is designated LA.

Carriage and carriage jaw mechanism

The carriage 90 (Figs. 4, 5 and 6) is of generally rectangular cross section and hollow, and it has a lower portion 91, of reduced cross sectional area, reinforced by ribs 92. The lower end of the portion 91 is open and the upper end of the carriage body is closed by a top plate 93. The opposite sides of the carriage are closed by plates 94, each of which has an inwardly-extending annular flange 95. Carriage 90 is mounted to reciprocate back and forth above table 20, such movement being imparted to the carriage by the means now to be described. A bracket 96, fastened to and extending above the top plate 93, is fixed to one end of a piston rod 97, which extends through an opening 98 in endplate 30 and carries a piston 99 working in a cylinder 100 (Fig. 4). One end of this cylinder is closed, except for a hole for the piston rod, by the flanged end cap 101, which is fastened to the end plate 28, and the other end of cylinder 100 is closed by the flanged end cap 102, which is fastened to a wall 103, or other suitable support fixed with respect to the framework of the machine. A pipe 104 admits fluid pressure to the end of cylinder 100 adjacent endplate 28, while a pipe 105 admits fluid pressure to the opposite end of said cylinder. By admitting fluid pressure to the cylinder through pipe 104, and venting it from the cylinder through pipe 105, the carriage 90 will be caused to move from left to right above the table, and by admitting fluid pressure to cylinder 100 through pipe 105 and venting it from the cylinder through pipe 104, the carriage will be caused to move from right to left across the table. The means for controlling the admission of fluid pressure to, and the venting of it from, pipes 104 and 105, will be described hereinafter.

A pair of spaced studs 106 (Fig. 6) are fastened to the front and rear walls of carriage 90 and extend horizontally, having pins 107 which receive the inner races of ball bearings 108, the outer races of which run on tracks 109 provided on the lower flanges of channels 110, secured to the inner sides of the channel beams 31. Thus, the carriage 90 is mounted to reciprocate horizontally back and forth across the table, from one side thereof to the other.

A sleeve 111 (Fig. 5) is journaled at its ends in ball bearings 112 supported by the inwardly-extending annular flanges 95. The central portion of the sleeve 111 is internally splined, as indicated at 113, and the splines thereof fit the external splines of shaft 76, so that sleeve 111 is slidable with respect to shaft 76 but non-rotatable with respect thereto. Edge cams 114, 115, 116 and 117 are fixed to sleeve 111, within the carriage.

Figure 5:
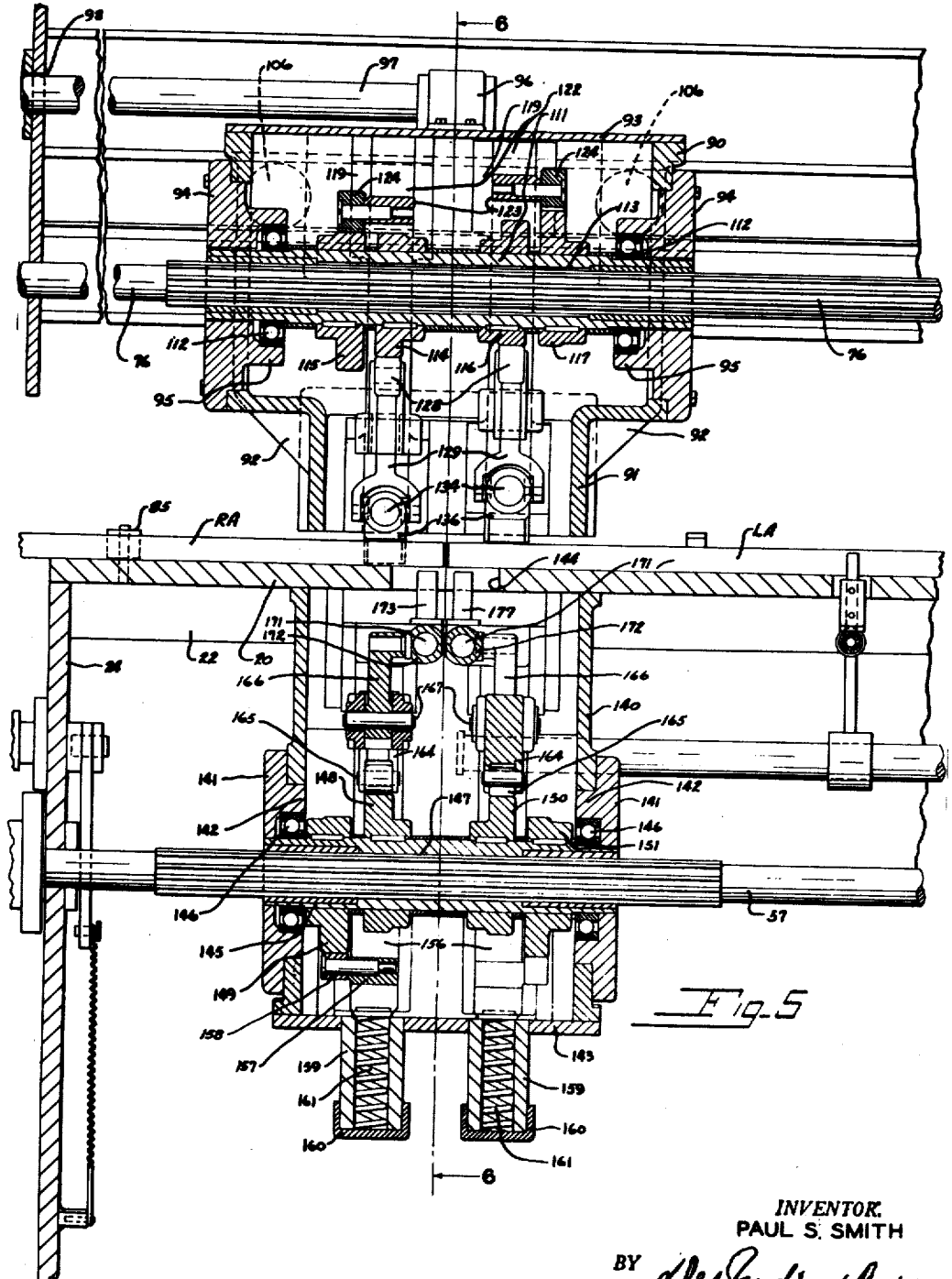
Fig. 5 is a fragmentary, vertical, sectional view taken on the line 5—5 of Fig. 2.
Figure 6:
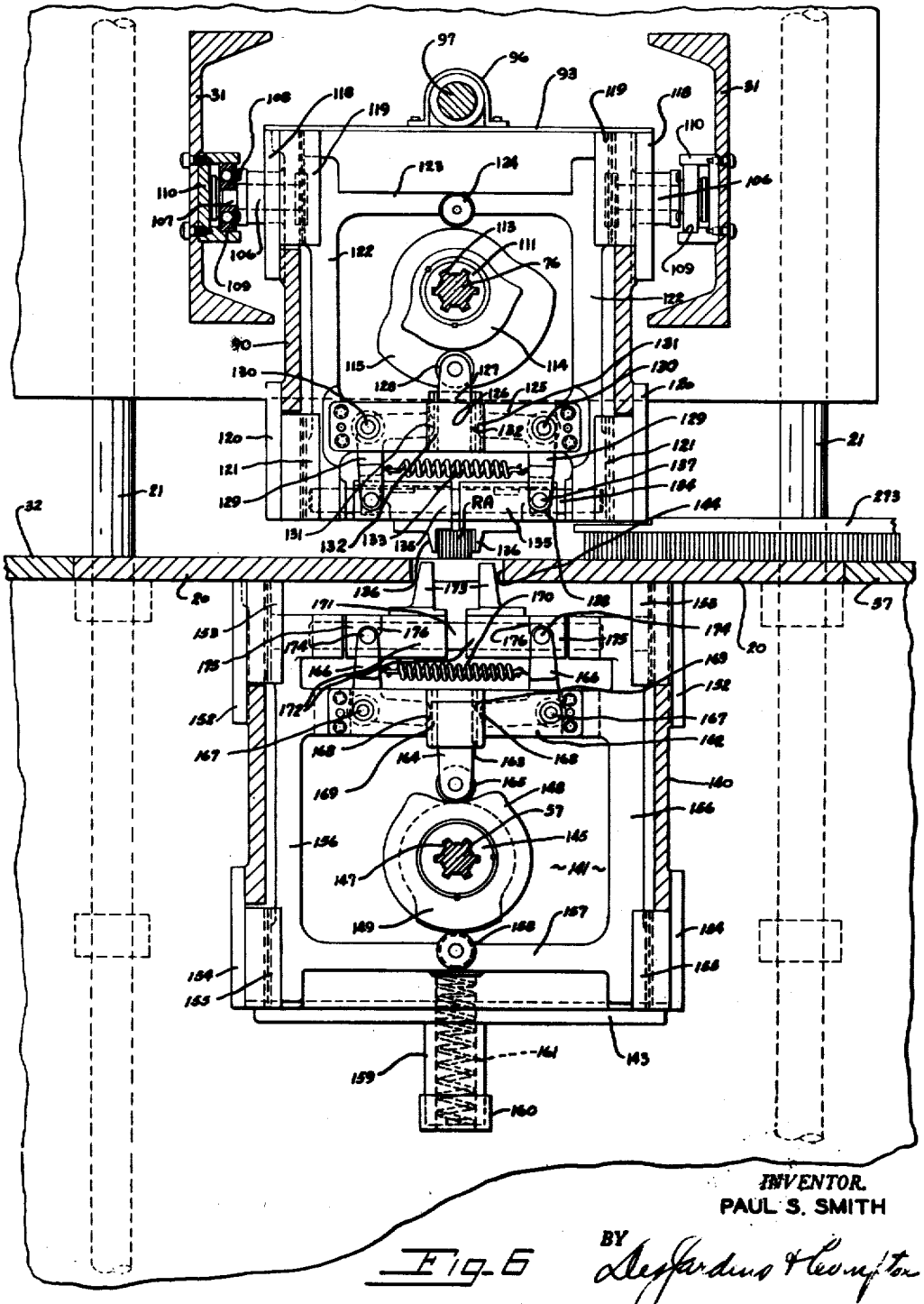
Fig. 6 is a vertical, sectional view, taken no the line 6—6 of Fig. 5

Openings in the upper portions of the front and rear walls of carriage 90 are closed by plates 118 (Fig. 6), having integral therewith a pair of inwardly-projecting channel guides 119, and openings in the lower portions of the front and rear walls of carriage 90 are closed by plates 120 having integral therewith a pair of inwardly-projecting channel guides 121. The guides 121 and 119 are aligned with each other, vertically. There are two sets of channel guides, 119 and 121, one at the front and the other at the rear of the carriage 90, and two slides 122 are mounted within the carriage to move vertically in these guides. Each slide 122 includes two side members and an upper cross member 123 carrying a roller 124, said rollers, as illustrated in Figs. 5 and 6, engage the edge cams 115 and 117. Slide 122 also includes a partly hollow cross member 125, extending between and secured to the side members of the slide. It has a central opening 126 of rectangular cross section, in which there is slidable a rectangular portion of the plunger 127. The upper end of the plunger is forked and carries a roller 128 engaging edge cam 114. Two bell cranks 129 are fulcrumed on pins 130, carried by cross member 125, with the horizontal arms of the bell cranks within the hollow portion of said cross member and extending toward the plunger 127. The ends of these bell crank arms are provided with toothed sectors 131, which mesh with racks 132 formed on the sides of plunger 127, so that, as plunger 127 is moved vertically with respect to the cross member 125, the bell cranks 129 will be rocked on their pivots. Spring 133 has its ends connected to the vertical arms of the bell cranks and tends to move them toward each other. A guide rod 134 extends between, and is fastened to, the lower portions of the side members of slide 122, and jaw carriers 135 are slidably mounted on this rod. Jaws 136 are fastened to the jaw carriers and depend therefrom. The lower ends of the vertical arms of bell cranks 129 are forked and receive the pins 137, integral with rectangular members 138, which slide in rectangular recesses in the jaw carriers 135. When plunger 127 is moved downwardly with respect to the cross member 125, the bell cranks 129 are rocked against the tension of spring 133, causing the jaws 136 to move away from each other, and spring 133 rocks the bell cranks in the opposite direction to cause the jaws to move toward each other, when permitted by cam 114.

The jaws 136, slide 122 and the operating means therefor, shown in Fig. 6, are actuated by the edge cams 114 and 115, and this pair of jaws grips and releases a tape bundle drawn from the right side of the machine and indicated as RA. As the carriage moves from right to left across the machine, these jaws will draw the tape bundle RA across the table from right to left. Carriage jaws 136, illustrated in Fig. 6, will be referred to as the right carriage jaws and they are shown at the left in Fig. 5. There is an identical pair of jaw members 136, and an identical slide 122 and the actuating parts therefor, shown at the right in Fig. 5 and actuated by the edge cams 116 and 117. These will be referred to as the left carriage jaws and they grip and release tape bundle LA drawn from the supply of tape at the left side of the machine, and draw said tape bundle LA from left to right across the table as the carriage moves from left to right.

Table jaw mechanism

The table jaw mechanism comprises, at each side of the table, two pairs of table jaws, referred to as outer and inner table jaws, each having its actuating mechanism so that the table jaws are projected above and retracted below the top of the table, and caused to grip and release a tape bundle, at appropriate points in the cycle of operations. The table jaws at the right side of the table are provided for gripping and releasing a tape bundle RA, formed of tapes supplied from the coils supported at the right side of the machine, and these will be referred to as right outer table jaws and right inner table jaws. The table jaws at the left side of the machine are provided for gripping and releasing, at proper points of the cycle, a tape bundle LA formed from tapes from the coils supported at the left side of the machine, and these table jaws will be referred to as left outer table jaws and left inner table jaws. The table jaws and their actuating mechanism will be described with reference to Figs. 5 and 6. Fig. 5 shows, at the left, the right outer table jaws 173 and their actuating mechanism, and, at the right, the right inner table jaws 177 and their actuating mechanism. Fig. 6 shows the right outer table jaws 173. The left outer and inner table jaws are not illustrated in detail, since they are precisely identical with the right table jaws and their actuating mechanisms.

Referring to Fig. 5, a cam box 140 is secured to and depends below the table 20. Openings in the side of this cam box are closed by plates 141, each having an inwardly-extending annular flange 142. The bottom of the cam box is closed by plate 143 secured thereto. The cam box is symmetrically arranged with respect to an opening 144 in table 20. A sleeve 145 is journaled in ball bearings 146 housed within the annular flanges 142, and the central portion of this sleeve is internally splined at 147. Shaft 57 extends through this sleeve and the external splines on the externally-splined portion of said shaft fit the internal splines 147 of sleeve 145, so that the sleeve is driven by said shaft. Edge cams 148 and 149 are fixed on the sleeve 145 and actuate the right outer table jaws. Edge cams 150 and 151 are also fixed on sleeve 145 and actuate the right inner table jaws.

Referring to Fig. 6, openings in the upper portions of the front and rear walls of cam box 140 are closed by plates 152 having integral therewith a pair of inwardly projecting channel guides 153. Openings in the lower portions of the front and rear walls of cam box 140 are closed by plates 154, having integral therewith a pair of inwardly-projecting channel guides 155. The channel guides 153 and 155, on the same wall of the cam box, are aligned with each other, so as to provide two parallel guideways, in each of which a slide 156 is vertically movable. Slide 156 comprises a pair of side members connected near the lower ends thereof by a cross bar 157, which carries a roller 158 engaging edge cam 149, in the case of the outer table jaw mechanism shown in Fig. 6. The corresponding slide 156 and roller 158 for the inner table jaw mechanism engages edge cam 151. Referring to Fig. 5, two tubes 159 are fixed in openings in the bottom plate 143 of the cam box, each in line with one of the slides 156. The lower end of each of these tubes is closed by a cap 160 and a spring 161 is interposed between the cap and the corresponding cross bar 157 of slide 156, so that the spring tends always to force the roller 158 upwardly against the cam which actuates it. It will appear, therefore, that the slides 156 are normally pressed upwardly in the cam box, but are moved downwardly therein, at the proper points of the cycle, by cams 149 and 151.

Each slide 156 includes a partly hollow cross member 162 fastened to the side members of the slide. Each cross member has an opening 163 of rectangular cross section, in which a rectangular portion of plunger 164 is slidable. The lower end of plunger 164 is forked and carries a roller 165, which, in the case of the outer table jaw mechanism, engages edge cam 148, and, in the case of the inner table jaw mechanism, engages edge cam 150. Two bell cranks 166 are fulcrumed in cross member 162 on pivot pins 167, the horizontal arms of said bell cranks being housed within the hollow portion of said cross member. The end of the horizontal arm of each bell crank 166 is formed with a toothed sector 168, which meshes with a rack 169 formed on the side of the plunger 164, so that vertical movement of the plunger with respect to cross member 162 rocks the bell cranks on their pivots. A spring 170 is fastened at its ends to the vertical arms of bell cranks 166 and tends to rock them to move the upper ends of the vertical arms toward each other, while upward movement of plunger 164 with respect to the cross member rocks the bell cranks in opposite directions against the tension of spring 170.

A guide rod 171 extends between, and is fastened to, the upper portions of the side members of slide 156. Jaw carriers 172 are slidable on rod 171 and each jaw carrier has secured thereto a jaw 173, which extends upwardly therefrom and may be projected upwardly through the opening 144 in the table 20. The jaws 173, shown in Fig. 6, are the outer table jaws. The similar jaws 177, shown in Fig. 5, are the inner table jaws and both pairs of jaws may be projected upwardly through the opening 144 in table 20. The upper end of the vertical arm of each bell crank 166 receives a pin 174 integral with a rectangular member 175, which is slidable in a rectangular recess 176 formed in the corresponding jaw carrier 172.

In general, it will be noted that spring 161 tends to move its slide 156 upwardly to project its table jaws, such as 173, through opening 144 into position above the table top, where they may grip the tape bundle, and the slide is retracted to withdraw the jaws 173 below the table 20 by cam 149. Spring 170 tends to move the table jaws 173 toward each other to grip a tape bundle, but such action is controlled by cam 148. The particular formation of cams 148, 149, 150 and 151 will be described later, in connection with the description of the timing of the machine, but it is to be noted that cams, such as 148 and 150, have a special form, so that slide 156 may move vertically in the cam box 140 without causing a vertical movement of the plunger 164 with respect to the cross member, such as would cause the jaws 173, for example, to grip a tape bundle.

As stated above, an identical jaw mechanism is provided at the left side of the machine. This comprises the left outer table jaws 173 and the actuating mechanism thereof, and the left inner table jaws 177 and their actuating mechanism, and, as indicated in Fig. 2a, the left table jaws 173 and 177 are adapted to be projected and retracted through the opening 178 in the table 20, so as to grip and release, at proper points of the cycle, a tape bundle LA formed from tapes drawn from the supply at the left side of the machine.

*Bundle-severing mechanism*

Means are provided for severing the tape bundles to form strip bundles therefrom, which comprise two saw units, a right-hand saw unit at the right of the table and a left-hand saw unit at the left thereof. The left saw unit is illustrated in Fig. 3a. These two saw units are shown in plan view in Figs. 2 and 2a and they are identical, except that, in the left unit, the saw is arranged at the left of the axis of the motor shaft, whereas, in the right unit the saw is arranged at the right of the axis of the motor shaft. In each unit, the vertical plane of the saw is at right angles to the longitudinal center-line of table 20 and so located that the saw will work between the outer table jaws 173 and the inner table jaws 177 at that end of the table.

Referring to Fig. 3a, each saw unit comprises a base 180 of U-shape in cross section, having laterally-extending flanges 181, which rest on and are bolted to the table extension 32. Upper surfaces of the base are machined at 183 and these machined surfaces slope downwardly toward the table 20 at a slight angle. Square grooves 184 are cut in the sides of base 180, parallel to surfaces 183, and receive inwardly-directed flanges on the lower portions of the legs of a carriage 185, which is of inverted U-shape cross section and has portions resting on the machined surfaces 184. The inclined forward portion 186 of the carriage has mounted thereon, and secured thereto, a gear casing 187 housing a pair of meshing bevel gears, which are connected, respectively, to the saw shaft 188 and the input shaft 189 at right angles thereto. The saw 190 is fixed to the end of saw shaft 188 and, in Fig. 3a the saw is shown in the cutting position, in which it has severed a tape bundle on table 20. The input shaft 189 is connected by the flexible coupling 191 to the shaft 192 of an electric motor 193, mounted on the support 194 fixed to the carriage. It will be seen that, as the carriage 185 reciprocates on the base, the motor and saw will be moved from the position shown in dotted lines in Fig. 3a to the full line position and, then, returned to the dotted line position.

Movement is imparted to the carriage 185 by hydraulic pressure and, for that purpose, a cylinder 195 is provided, both ends of which are closed, one closed end being fastened at 196 to the base 180. The other end of the cylinder is fastened to the base 180 by an adjustable bracket 197, the bracket being rendered adjustable so that the cylinder may have its axis disposed accurately parallel to the guide surfaces 183. A lug 198, integral with carriage 185, has fastened thereto, at 199, one end of a piston rod 200, the other end of which has fastened thereon a piston 201 working in the cylinder 195. A pipe 202 is connected to one end of cylinder 195 and a pipe 203 is connected to the opposite end of said cylinder, and fluid pressure may be admitted to, and vented from, the respective ends of said cylinder through said pipes 202 and 203, under control of an electromagnetic valve, to which reference will be made later. When fluid pressure is admitted through pipe 202, and vented through pipe 203, the carriage will be caused to move rearwardly to move the saw unit from the position shown in full lines in Fig. 3a to the dotted line position, and, when fluid pressure is admitted to the cylinder through pipe 203, and vented through pipe 202, the carriage will be caused to move in the opposite direction to move the saw forward to sever the tape bundle.

*Strip-feeding mechanism*

After each tape bundle has been drawn across the table, it is severed to form a strip bundle, and means are provided for shifting the strip bundle laterally to feed the strips to the magazine, from which they are drawn for use. This strip-feeding mechanism comprises two sets of strip-feeding finger pairs and, since one set of such finger pairs receives and shifts laterally a strip bundle formed from the left tape bundle, LA, these will be termed the left strip-feeding fingers. The other set of such finger pairs, which receives and shifts laterally a strip bundle formed from the right tape bundle, RA, will be termed the right strip-feeding finger pairs. These two sets of pairs of fingers are alternately effective, that is to say, while one set is gripping a strip bundle and shifting it laterally out of the path of the tape bundle, the other set releases the strip bundle previously shifted and returns to position, so that the tape bundle may be drawn between the fingers of this set preparatory to their gripping it and shifting it laterally.

Referring to Fig. 7, a channel-shaped member 210 is fastened to the underside of the table 20, being symmetrically arranged with respect to the longitudinal centerline of the table and the axis of shaft 57. The base of member 210 is provided with a plurality of groups of downwardly-extending tubular bosses, each group comprising the bosses 211 and 212 arranged at equal distances on each side of the centerline, and the central boss 213. Housed within the member 210 are a plurality of yokes 214, one for each group of these bosses. Guide pins 215 and 216, secured to the bottom of yoke 214 and depending therefrom, are slidable in the bosses 211 and 212, respectively. An actuating rod 217, the upper end of which is secured to the bottom of yoke 214, extends downwardly through the boss 213. The yoke 214 is raised and lowered by raising and lowering its rod 217. Mounted on brackets 218, fixed on a plate 219 secured to the bottoms of the beams 22 and 23, is a longitudinally-extending shaft 220, having thereon a plurality of arms 221, one arm for every other yoke in the member 210. Each arm 221 straddles the corresponding boss 212 and its inner end is pivotally connected, at 222, to the lower end of the corresponding actuating rod 217. Similarly mounted in the opposite portion of member 210 is a longitudinally-extending shaft 223, having thereon a plurality of arms 224, like the arms 221 and straddling the bosses 211 of alternate yokes. The inner ends of arms 224 are pivotally connected to the lower ends of the remaining actuating rods 217, as shown in Fig. 8. Thus, the shaft 220 serves to raise and lower one set of yokes 214, and the shaft 223 the other set of yokes.

Referring to Fig. 1, an arm 225 is fastened to the right end of shaft 220 and the free end of that arm carries a roller 226 engaging a cam 227 fixed on shaft 57. An arm 228 is also fast to shaft 220 and one end of a spring 229 is connected to the free end of arm 228, while the other end of the spring is connected to a spring anchor 230 fastened to a suitable part of the frame. The tension of spring 229 tends to rock shaft 220 counter-clockwise to raise the yokes 214 actuated thereby, and, when the lobe of cam 227 engages roller 226, shaft 220 is rocked clockwise to lower said yokes against the tension of the spring. An arm 231 is fast to the right-hand end of shaft 223 and has a roller 232, at the free end thereof, engaging the cam 233, which is also fast on shaft 57. An arm 234, also fast on shaft 223, has one end of spring 235 fastened thereto, the other end of the spring being fastened to a spring anchor 236 secured to the frame. Tension of spring 235 tends to rock shaft 223 clockwise to raise the yokes 214 actuated thereby, but, when the lobe of cam 233 engages roller 232, shaft 223 is rocked counter-clockwise against the tension of spring 235 to lower said yokes.

Each yoke 214 has tubular bosses 237 and 238 in the walls thereof, in which a hollow tube 239 is slidably mounted. Referring to Fig. 10, there is a spacing collar 240 fixed to the tube 239 and two cylinders 241 surrounding it, one on each side of the spacing collar. One end of each cylinder is closed by a cap 242, fixed thereto and provided with a suitable packing gland for making a fluid-tight joint with tube 239, and the other end of each cylinder is closed by the cap 243 fixed thereto and having suitable packing for making a fluid-tight joint with tube 239. To each cap 243 is fastened a member 244, to which a finger 245 is attached, which fingers may be projected upwardly through an elongated opening 246 in the table 20, when the corresponding yoke is raised. A piston 247, fixed to the tube 239, works in each cylinder 241, and a spring 248 is housed within each cylinder, being compressed between the end gap 243 and the piston 247. These springs 248 tend to move cylinders 241 toward each other, to the extent permitted by the spacing collar 240, thus causing the fingers 245 to approach each other to clamp a strip bundle. Ports 249 are provided in the tube 239, communicating with the space between the corresponding piston 241 and the end cap 242. When fluid pressure is admitted to tube 239, it is effective to move the cylinders 241 away from each other, against the pressure of springs 248, to cause the fingers 245 to release a bundle.

Referring to Figs. 7 and 8, every other tube 239 extends to the left through an opening in beam 22, and has its left end closed by a cap 250, which is pivotally connected by link 251 to the upper end of an arm 252, fast on shaft 253. The opposite end of each such tube 239 has connected thereto a pipe 254, by which fluid pressure may be admitted to the tube or exhausted therefrom. An arm 255, fast on one end of rock shaft 253, is pivotally connected at 256 to a piston rod 257, which carries a piston working in the cylinder 258. This cylinder is closed at both ends and mounted in a bracket 259, so that the cylinder may rock slightly about trunnions 260. Fluid pressure is admitted to and vented from one end of cylinder 258 by pipe 261, and to the other end of said cylinder by pipe 262. Each of the remaining tubes 239 has its right end closed by a cap 250, connected by link 251 to the upper end of arm 263 fast on the shaft 264. An arm 265, fast at one end of said rock shaft, is pivotally connected at 266 to a piston rod 267, which has fastened thereto a piston working in the cylinder 268, closed at both ends. Cylinder 268 is likewise mounted in a bracket 269, so as to rock slightly about the trunnions 270. Fluid pressure is admitted to and vented from one end of the cylinder by pipe 271, and is admitted to and vented from the other end of the cylinder by pipe 272.

It will be seen that, by controlling the times of admitting pressure to and venting it from pipes 261 and 262, one set of tubes 239 will be caused to shift longitudinally to move the corresponding set of fingers in their openings 246, to shift the strip bundles laterally on table 20, and to press the mass of strips laterally on table 20 and table extension 37 toward the magazine from which they are to be drawn for use. It wil be observed that these strips are arranged on edge on table 20 and table extension 37 and that they pass beneath a plurality of spaced bars 273, spaced from table 20 and table extension 37 a distance slightly greater than the width of the strips.

*Fluid pressure control*

As indicated in the foregoing description, a number of the mechanisms are controlled by the application of fluid pressure to act at predetermined points in the cycle of operation. The fluid pressure controls are indicated diagrammatically in Fig. 11. An electromagnetic valve 274 is provided having ports 275, 276, 277 and 278. Pressure line 279, from a source of fluid pressure, is connected to port 276. Return line 280 is connected to port 275. Port 277 is connected by line 105 to one end of the cylinder 100, which causes the reciprocation of the carriage over the table. Line 104, leading from the opposite end of cylinder 100, is connected to port 278. Valve 274 has two positions, according to whether the circuit is made or broken to the electromagnet controlling the valve. In one position, port 276 is connected to port 278 and port 277 is connected to port 275. In this position fluid pressure from line 279 will be admitted through line 104 to one end of the cylinder 100, and pressure will be vented from the opposite end of said cylinder through line 105. In this position, the fluid pressure admitted through line 104 moves piston 99, and the carriage connected thereto, in one direction to the limit of movement permitted the piston in the cylinder. In the other position of valve 274, ports 276 and 277 and ports 275 and 278 are connected, so that fluid pressure from line 279 is admitted through line 105 to cylinder 100, and fluid pressure is vented from the cylinder through line 104 and return line 280, thus causing piston 99 to move in the opposite direction in cylinder 100, to the extent permitted. The making and breaking of the circuit to the electromagnetic valve 274 is controlled by one of the cam switches 281, mounted on shaft 79 within the casing 39 (Fig. 4). The formation of this switch cam is such as to make and break the circuit at the proper points of the cycle.

Two electromagnetic valves 281 are provided, one for controlling the application of fluid pressure to each of the cylinders 195 of the respective saw units. Each valve 281 has ports 282, 283, 284 and 285. Port 284 is connected to the pipe 202 leading to one end of cylinder 195 and port 285 is connected to pipe 203 leading to the opposite end of said cylinder. Port 283 is connected by pipe 286 to the outlet of a gear pump 288 (Fig. 1) which, with its driving motor, is mounted on top of a tank 289, from which the pump draws fluid through pipe 290. Return pipe 287 returns the fluid from valve 281 to tank 289. A by-pass connection 291 is provided between pipes 287 and 286, and it includes a relief valve 292, whereby the fluid may be returned to the tank from the pump, without going through either of valves 281, when the pressure in pipe 286 becomes excessive. Valve 281 has either of two positions, depending upon whether the circuit to the electromagnet controlling it is made or broken. In one position, port 283 is connected to port 284 and port 285 is connected to port 282. In that position, fluid pressure from line 286 is transmitted through line 202 to one end of the cylinder 195 to move the saw unit in one direction, to the extent permitted by the travel of the piston in cylinder 195. At the same time, pressure is vented from the opposite end of cylinder 195 through line 203 to return line 287. In the other position of valve 281, port 283 is connected to port 285 and port 284 to port 282, and fluid pressure is admitted to the opposite end of the cylinder through line 203 from input line 286, and vented through line 202 and return line 287, thus causing the saw unit to move in the opposite direction, to the extent of the movement permitted by the travel of the piston in the cylinder. The circuits to the electromagnets controlling the two valves 281 are made and broken by two of the cam switches 281 on shaft 79 within the casing 39, at appropriate times in the cycle of operation.

Two electromagnetic valves 293 are provided, one for controlling the admission of fluid pressure to and venting it from each of the cylinders 258 and 268, for shifting the respective sets of strip-feeding fingers. Each valve 293 has four ports, 294, 295, 296 and 297. Port 296 is connected by pipe 262 to one end of cylinder 258, and port 297 is connected by pipe 261 to the opposite end of that cylinder. In the case of cylinder 268, port 296 is connected to pipe 272 and port 297 to pipe 271. Port 295 is connected by branch line 299 to the line 298, which is connected to an air compressor as a source of air pressure. Port 294 is connected to the vent pipe 300. Each valve 293 may have two different positions, depending upon whether the circuit to the electromagnet controlling it is made or broken. In one position, ports 295 and 296 are connected so that air pressure is admitted to one end of the cylinder, 258 or 268, and ports 294 and 297 are connected so that pressure is vented from the opposite end of that cylinder. In the other position of valve 293, ports 295 and 297 are connected, and port 296 is connected to port 294, so that the application of pressure to the cylinder, and its venting therefrom, is reversed from the condition obtaining in the other position of the valve. The circuits to the electromagnet controlling valves 293 are made and broken by two of the cam switches 281.

Admission of air pressure to, and its venting from, the tubes 239 is controlled by two electromagnetic valves 301, one for each of the two sets of tubes 239. Each valve 301 has three ports, 302, 303 and 304. Port 304 is connected to the pipe 254 connected to one end of tube 239. Port 303 is connected by branch 305 with the line 298 connected to the air compressor or other source of air pressure. Port 302 is connected to the vent pipe 306. In one position of the valve, port 303 is connected to port 304 and air pressure is admitted to tube 239 through the pipe 254. In the other position of the valve, port 302 is connected to port 304 and port 303 is blocked, so that air pressure is vented from tube 239 through pipe 254 and vent pipe 306. The electromagnets of valves 301 are controlled by two of the cam switches 281, so that said valves are shifted from one position to the other at appropriate points in the cycle.

*Timing*

Before describing the timing of the various parts of this mechanism, reference should be made to the contours of the cams used for controlling the carriage jaws, the outer table jaws and the inner table jaws. Fig. 12 is a view in side elevation of a pair of the cams 114 and 115 controlling the raising and lowering and the opening and closing of one pair of carriage jaws. This view shows the cams in the positions, with respect to rollers 124 and 128, which they occupy when the carriage jaws are raised above the table and open. As the cams turn clockwise, roller 124 descends portion 115a of cam 115 and slide 122 is permitted to move downwardly, lowering the carriage jaws toward the table. At the same time, roller 128 ascends portion 114a of cam 114, which imparts to roller 128 exactly the same downward movement that was permitted to roller 124 by cam portion 115a, so that no movement of plunger 127 relative to slide 122 is caused by the downward movement of said slide. Immediately thereafter, roller 128 descends portion 114b of cam 114 and plunger 127 moves upwardly under the tension of spring 133, so that the carriage jaws are moved toward each other to clamp a tape bundle. Roller 124 continues to roll over portion 115b of cam 115, which permits the jaws to remain in the lowered position, while roller 128 engages portion 114c of cam 114, which maintains the carriage jaws in clamped position until, at the end of portion 114c, and just before roller 124 leaves the portion 115b, roller 128 ascends portion 114d of cam 114, which forces down roller 128 to open the jaws. Roller 124 now ascends portion 115c of cam 115, while, at the same time, roller 128 descends portion 114e of cam 114, these portions of the respective cams being so formed that, although frame 122 is raised to raise the carriage jaws above the table, roller 128 is permitted to have an identical upward movement at the same time, so that there is no relative motion between plunger 127 and the cross member 125 of slide 122, and the carriage jaws remain open. As the cams continue to rotate, roller 124 engages portion 115d of cam 115, while roller 128 engages portion 114f of cam 114, until the positions shown in Fig. 12 are reached.

Fig. 13 is a view in side elevation of a pair of the cams 148 and 149 for operating the outer table jaws. It shows the cams in the position they occupy when the table jaws are retracted below the table and open. As cams 148 and 149 revolve clockwise from the position shown, roller 158 descends portion 149a of cam 149, which permits the slide 156 to rise to project the jaws. At the same time, an equal upward movement is imparted to roller 165 as it ascends portion 148a of cam 148, so that there is no movement of plunger 164 relative to slide 156 and the outer table jaws remain open. Portion 149b of cam 149 now moves in engagement with roller 158, permitting the outer table jaws to remain projected, but, at the very beginning of this movement, roller 165 descends portion 148b of cam 148, permitting spring 170 to close the outer table jaws upon a tape bundle. Portion 148c of cam 148 now moves in engagement with roller 165 holding the jaws clamped on the bundle until, just before roller 158 leaves portion 149b of cam 149, when roller 165 ascends portion 148d of cam 148, which forces the plunger 164 upwardly to open the jaws and release the bundle. Roller 165 now ascends portion 149c of cam 149, which lowers slide 156 to retract the outer table jaws, and, at the same time, roller 165 descends portion 148e of cam 148, so that the downward movement of slide 156 does not effect relative motion of plunger 164 with respect to slide 156 and the table jaws remain open. Portion 148f of cam 148 now engages roller 165 and portion 149d of cam 149 engages roller 158, until the starting point, shown in Fig. 13, is reached.

Fig. 14 shows in side elevation a pair of the cams 150 and 151 for actuating the inner table jaws. These are much like the cams 148 and 149 for operating the outer table jaws, shown in Fig. 13, and the portions of cams 150 and 151 have been similarly denoted. The principal difference between the cams for the inner table jaws and those for the outer table jaws is in the relative length of portions 151b and 151d compared with 149b and 149d, and of portions 150c and 150f compared with 148c and 148f, necessitated by the fact that the inner jaws are to be projected and clamped on the bundle for much less of the cycle than in the case of the outer table jaws.

Fig. 9 is a timing chart for this apparatus. At 0° (or 360°) of the cycle, the left outer table jaws 173 are retracted below the table and open, the left saw 190 is withdrawn, the left inner table jaws 177 are below the table and open, the left set of strip-feeding fingers 245 are open and projected above the table, and the left carriage jaws 136 are projected and clamped upon a tape bundle. The carriage 90, which is at the left of the table, is about to start its travel from left to right. The right carriage jaws 136 are retracted within the carriage body and open, the right set of strip-feeding fingers 245 is projected above the table clamping a strip bundle and pressing it toward the strips in the magazine, the right inner table jaws 177 are retracted below the table and open, the right saw 190 is withdrawn and the right outer table jaws 173 are projected above the table and clamped on the tape bundle RA. At 30°, the left saw unit begins its advance toward the left tape bundle LA. At 63°, the left outer table jaws 173 and the left inner table jaws 177 are projected above the table. At 84°, the carriage 90 completes it travel from left to right and the left outer table jaws 173 and the left inner table jaws 177 close to clamp the left tape bundle LA, which has been drawn from left to right across the table by the carriage. At 90°, the left saw 190 cuts the left tape bundle LA to form a strip bundle and, at the same time, the left set of strip-feeding finger pairs 245 close to clamp the strip bundle thus formed. At 96°, the left carriage jaws 136 open to release the strip bundle. At 108°, the left carriage jaws 136 are retracted above the table and the right carriage jaws 136 are projected toward the table, straddling the tape bundle RA. At 114°, the left inner table jaws 177 open to release the strip bundle. At 120°, the left saw 190 begins its withdrawal movement. At 123°, the left inner table jaws 177 are retracted below the table. At 132°, the projected right carriage jaws 136 close to clamp the tape bundle RA. At 144°, the left set of strip-feeding fingers 245 advances to shift a strip bundle toward the magazine. At 147°, the right outer table jaws 173 open to release the tape bundle RA. At 150°, the left set of feeding fingers begins to press the strip bundle against the supply of previously fed strips. At 156°, the right set of strip-feeding finger pairs 245 falls below the table, thus being withdrawn from the strip bundle which it engaged, and the open right outer table jaws are retracted. At 174°, the withdrawal movement of the left saw 190 is completed and the right set of strip-feeding finger pairs 245 is retracted to initial position in line with the the path of the tape bundle. At 180°, the carriage 90, which has remained stationary at the right-hand position from 84°, begins its travel from right to left to draw the tape bundle RA across the table. At the same time, the right set of strip-feeding finger pairs 245 rises above the table. At 210°, the right saw 190 begins it advance toward the tape bundle RA. At 243°, the right inner table jaws 177 and the right outer table jaws 173 are projected above the table. At 264°, the carriage 90 completes its travel from right to left and, at the same time, the right inner table jaws 177 and the right outer table jaws 173 close to clamp the tape bundle RA. At 270°, the right saw 190 cuts the tape bundle RA to form a strip bundle, and the right set of strip-feeding finger pairs 245 closes to clamp the strip bundle. At 276°, the right carriage jaws 136 open to release the strip bundle. At 288°, the left carriage jaws 136 are projected toward the table to straddle the tape bundle LA, and the right carriage jaws 136 are retracted within the carriage body. At 294°, the right inner table jaws 177 open and release the strip bundle. At 300°, the right saw 190 begins its withdrawal movement. At 303°, the right inner table jaws 177 are retracted below the table. At 312°, the left carriage jaws 136 close to clamp the tape bundle LA. At 324°, the right set of strip-feeding finger pairs 245 advances to shift the strip bundle toward the strips in the magazine. At 327°, the left outer table jaws 173 open to release the tape bundle LA. At 330°, the right set of strip-feeding finger pairs 245 begins to press the strip bundle against the strips in the magazine. At 336°, the left outer table jaws are retracted below the surface of the table and the left set of strip-feeding finger pairs 245 falls below the table. At 354°, the left set of strip-feeding finger pairs 245 is retracted toward initial position and the finger pairs open, and the right saw 190 ends it withdrawal movement. At 360°, the left set of strip-feeding finger pairs 245 rises above the table and the carriage 90 begins it movement from left to right.

*Operation*

Figure 2:
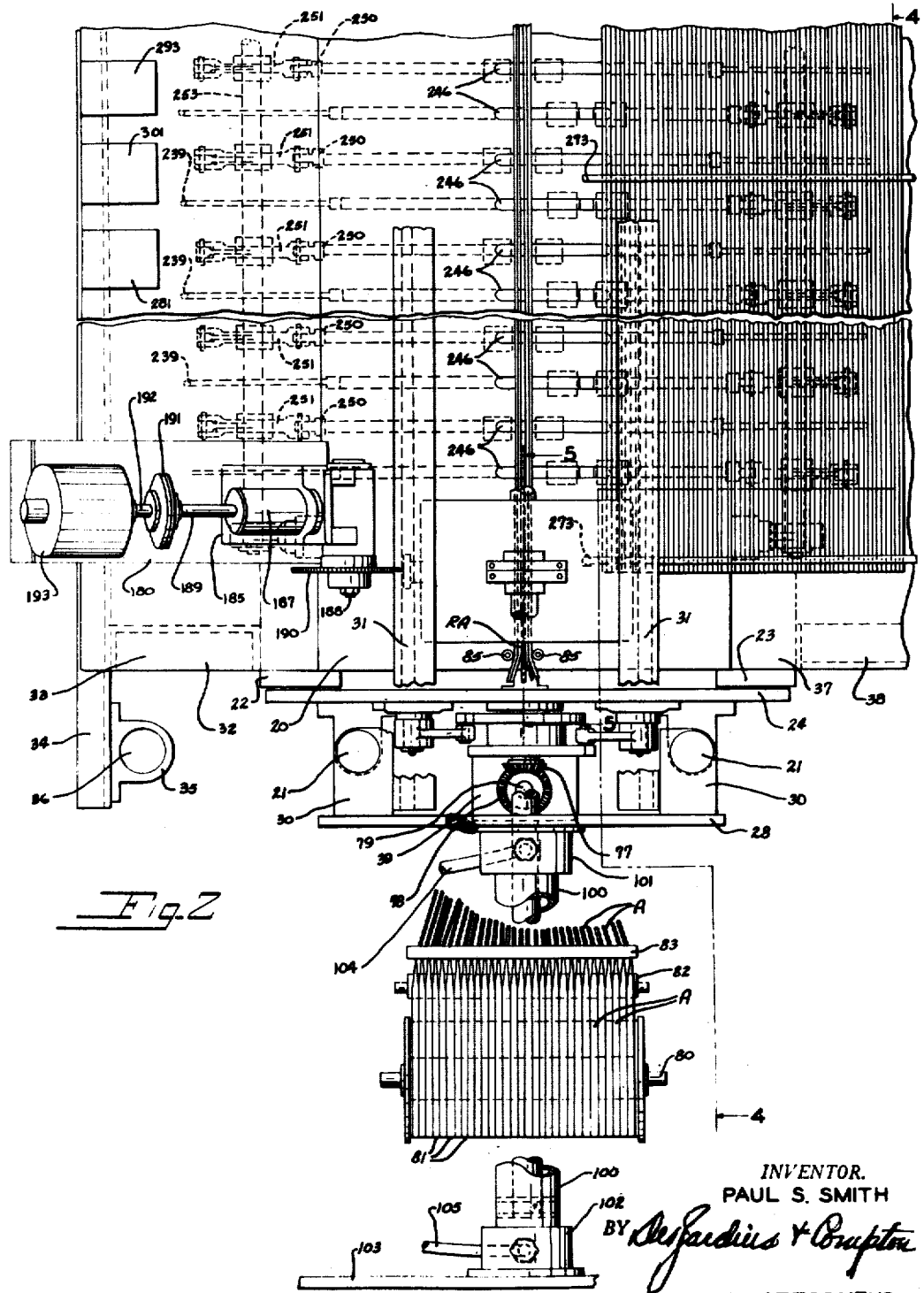

The strip-forming and feeding apparatus herein described is prepared for operation, as follows. A plurality of coils of chipboard tape 81 are mounted on the mandrels 80, at the right and left sides of the table (Figs. 2 and 2a). The operator draws successive tapes A from each of these coils at one side of the table over the surface of the guide roll 82 and, then, giving each tape a quarter turn into a vertical plane, passes it between a pair of the rollers 84 (Fig. 4) of the reed 83. The free ends of the tapes A are then condensed by hand into a bundle which the operator draws between the vertical rolls 85 and along the surface of the table 20, sufficiently to insure that the end of each tape has passed the position of the outer table jaws 173, at the corresponding end of the table. The apparatus is then operated under power until such outer table jaws 173 are projected, when the tape bundle is placed between them by hand and the jaws 173 allowed to clamp it. The free ends of the tapes are then severed by hand, adjacent to the inner edges of the jaws 173, and discarded. The apparatus continues to be operated under power until the carriage 90, which is assumed to have been at the opposite end of the table, traverses the latter and comes to rest centrally above the jaws 173 and 177, as shown in Fig. 5. A similar operation is then carried out by hand to insert a tape bundle from the tapes A of the coils 81 on the mandrel 80, at the opposite end of the table, between the outer table jaws 173 at that end to clamp the free ends. A metal bar 307, having a thickness corresponding to the width of the strips being handled, is placed on the table 20 parallel to the line of travel of the carriage, and in the approximate position shown in dotted lines in Fig. 1. The guide bars 273 are then adjusted to a height slightly greater than the width of the strips to be formed and the apparatus is ready for automatic operation. It is assumed that hydraulic fluid from an independent source is supplied to the line 279 (Fig. 11), that the gear pump 288 is in operation supplying fluid under pressure to line 286, that compressed air from an independent source, such as an air compressor, is being supplied to the line 299, that electric current is supplied to the circuits controlled by the cam switches 281, and that electric current is supplied to drive the motors 193 of the saw units. Power is then applied to the drive shaft 50 (Fig. 3) thus setting in motion drive shafts 57 and 76.

It will be assumed that the automatic operation starts at the beginning of a cycle, at which time the left tape bundle LA is clamped by the left carriage jaws 136, the carriage 90 being at the left side of the table. The right tape bundle RA is clamped by the right outer table jaws 173. The left outer table jaws 173 and the left inner table jaws 177 are open and below the table. The right inner table jaws 177 are also open and below the table. The right carriage jaws 136 are open and withdrawn within the carriage body. The strip-feeding finger pairs 245 of the left set are open and projected above the table, one finger of each pair being on either side of the path of the tape bundle. The right strip-feeding finger pairs 245 are above the table and advanced so as to press against bar 307. Both saw units are in their withdrawn position. At the beginning of the cycle, the carriage 90 begins its travel from left to right across the table, drawing the left tape bundle LA with it, between the fingers of the left set of finger pairs 245. Before the carriage reaches the limit of its movement to the right, the left outer and inner table jaws 173 and 177 have been projected above the table, straddling the left tape bundle LA, and, in the meantime, the left saw 190 has commenced its advance toward the tape bundle. At the instant the carriage reaches its right-hand position, the left outer and inner table jaws 173 and 177 close to clamp the tape bundle LA and, then, the left saw cuts the tape bundle LA to form a strip bundle. At the same instant, the fingers of the left set of finger pairs 245 close to clamp the strip bundle and the left carriage jaws 136 open to release it, said carriage jaws being retracted within the carriage body shortly thereafter. After completing the cut, the left saw 190 withdraws to its normal withdrawn position. In the meantime, after the carriage 90 reaches its right-hand position, the right carriage jaws 136 are projected from within the carriage body to straddle the end of the right tape bundle RA, and soon thereafter said jaws are closed on that tape bundle to clamp it. Shortly thereafter, the right outer table jaws 173 open to release the right tape bundle RA and are then retracted below the table. Just before the right outer table jaws open, the left set of strip-feeding finger pairs 245 advances toward the bar 307 to shift the strip bundle out of the path of the tape bundle and press it against the right set of strip-feeding finger pairs 245, which, however, soon falls below the level of the table so that the left set of strip-feeding finger pairs presses the strip bundle against the bar 307. After the right set of strip-feeding finger pairs falls below the table it is retracted to initial position, in line with the path of the tape bundle and opened, and immediately thereafter it rises so that the fingers of said set are in position for the right tape bundle RA to be drawn between them.

At the midpoint of the cycle, the carriage 90 is at its right-hand position and the right carriage jaws 136 clamp the end of the right tape bundle RA, the right inner and outer table jaws 177 and 173 being retracted below the table and open, and the left outer table jaws 173 being projected above the table and closed, clamping the end of the left tape bundle LA. The left set of strip-feeding finger pairs 245 is in advanced position pressing the strip bundle against the bar 307, while the right set of strip-feeding finger pairs 245 is projected above the table and the finger pairs are open so that the right tape bundle RA may be drawn between them. The carriage begins its movement from right to left, drawing the right tape bundle RA from right to left across the table between the fingers of the right set of strip-feeding finger pairs 245. Shortly before the carriage completes its travel from right to left, the right inner table jaws 177 and the right outer table jaws 173 are projected above the table and clamped on the right tape bundle RA at the instant the travel of the carriage from right to left is completed. In the meantime, the right saw 190 has advanced and, soon after the right outer and inner table jaws clamp the bundle RA, the right saw cuts it to form a strip bundle. Thereupon, the finger pairs 245 of the right set clamp this strip bundle and the right carriage jaws 136 release it and are retracted within the carriage body. At the same time, the left carriage jaws 136 are projected from the carriage body toward the table and clamp the end of the left tape bundle LA. At about the same time, the right inner table jaws 177 are opened to release the strip bundle and withdrawn below the table, the left outer table jaws 173 open to release the left tape bundle LA and are withdrawn below the surface of the table, and the right set of strip-feeding finger pairs 245 advances and presses the strip bundle against the preceding strip bundle toward the magazine. Soon after this advance of the right fingers 245, the left fingers 245 fall below the table and are then retracted to the position in line with the path of the tape bundle, opened, and rise above the table top.

It will be seen that, as the carriage travels from left to right, it draws the left tape bundle LA across the table, which tape bundle is then severed to form a strip bundle, which is gripped by one set of strip-feeding finger pairs and shifted laterally toward the magazine, while the carriage jaws grip the end of the right tape bundle RA and draw it from right to left across the table as the carriage moves from right to left, which tape bundle is then severed by the right saw to form another strip bundle, which is gripped by the right set of strip-feeding finger pairs 245 and moved laterally toward the magazine. The left outer table jaws grip the end of the left tape bundle LA and hold it stationary, while the carriage is moving from right to left, and the right outer table jaws 176 grip the end of the right tape bundle RA and hold it stationary while the carriage is moving from left to right. The left inner table jaws grip the left tape bundle LA for a short period during which the left saw 190 operates to cut that tape bundle to form a strip bundle, so that the bundle is clamped on either side of the point where the cut is made, at the instant of the cut. Similarly, the right inner table jaws 177 grip the right tape bundle RA at the instant the right saw cuts it to form a strip bundle. The movement of the carriage from left to right draws the left tape bundle LA between the fingers 245 of the left set of finger pairs so that the strip bundle formed by the severance of the left tape bundle is lodged and held in said fingers, which advance it and press it toward the magazine, or the bar 307 at the beginning of operation. Likewise, as carriage 90 moves from right to left it draws the tape bundle RA between the fingers of the right set of finger pairs 245, so that the strip bundle formed from tape bundle RA is held by them and then advanced and pressed against the preceding strip bundle. It will be understood, of course, that the bar 307 is for use merely at the beginning of automatic operation and that it will be withdrawn after the machine is running. Thus, successive strip bundles are formed by severing, first the left tape bundle, and then the right tape bundle, and so on, and the strip bundles successively formed are shifted toward the magazine successively by the left and right sets of strip-feeding finger pairs 245, so that tapes are drawn successively from the coils 81 at opposite sides of the machine, formed into tape bundles, the tape bundles severed to form the strip bundles, and the strip bundles continuously advanced toward the magazine, which is to be supplied with the strips.

I am aware that the apparatus shown and described herein is susceptible of considerable variation without departing from the spirit of my invention and, therefore, I claim my invention broadly as indicated by the appended claims.

Having thus described my invention, what I claim as new and useful and desire to secure by Letters Patent is:

1. A strip-forming and feeding apparatus comprising the combination of a table; a support, at one side of the table, on which a plurality of coils of chipboard tape may be mounted side by side for rotation about a common axis; means for gathering tapes from said coils into a tape bundle, in which each tape is disposed edgewise on the surface of the table; reciprocating carriage means for drawing said tape bundle lengthwise across the table; means for severing a portion of the tape bundle to form a strip bundle; and means for moving the strip bundle on said table in a direction perpendicular to the length of the bundle.

2. A strip-forming and feeding apparatus comprising the combination of a table; a support, at one side of the table, on which a plurality of coils or chipboard tape may be mounted side by side for rotation about a common axis; means for gathering tapes from said coils into a tape bundle, in which each tape is disposed edgewise on the surface of the table; means for drawing said tape bundle lengthwise across the table; means for severing a portion of the tape bundle to form a strip bundle; and means for moving the strip bundle on said table in a direction perpendicular to the length of a bundle, said means for drawing said tape bundle lengthwise across the table including a carriage, bundle-gripping means carried thereby, and means for causing said carriage to move across the table from side to side.

3. The apparatus of claim 2, in which there are means for automatically causing the bundle-gripping means to grip and release a bundle at predetermined points of the cycle of operation.

4. The apparatus of claim 3, in which there are automatic means for raising and lowering the bundle-gripping means at predetermined points of the cycle of operation.

5. The apparatus of claim 4, in which there are a slide mounted in the carriage, shiftable vertically with respect thereto and supporting the bundle-gripping means, and cam means acting on said slide to raise it.

6. The apparatus of claim 5, in which the bundle-gripping means comprise a pair of jaw members, slidable horizontally on said slide; a pair of bell-cranks fulcrumed on the slide, and each having one arm engaging a jaw member; spring means acting to move said jaw members toward each other; and cam means acting on said bell-cranks to separate said jaw members.

7. The apparatus of claim 6, in which the said cam means are edge cams fixed on an internally-splined sleeve journaled in said carriage, and said sleeve is driven by an externally-splined shaft, extending above the table from one side thereof to the other, said splined sleeve being slidable on said splined shaft but non-rotatable with respect thereto.

8. A strip-forming and feeding apparatus comprising the combination of a frame; a table supported thereby; a support, at one side of the table, on which a plurality of coils of chipboard tape may be mounted side by side for rotation about a common axis; means for gathering tapes from said coils into a tape bundle, in which each tape is disposed edgewise on the surface of the table; a carriage mounted for reciprocation above the table from one side thereof to the other; bundle-gripping means mounted in the carriage and adapted to grip the free end of a tape bundle; a link connected to said carriage; fluid pressure means acting on said link to reciprocate the carriage; means for severing a predetermined portion of said tape bundle to form a strip bundle; and means for moving the strip bundle on said table in a direction perpendicular to the length of the bundle.

9. The apparatus of claim 8 including a cylinder closed at both ends and fixed to said frame; a piston working in said cylinder and fastened to said link; and automatic means for admitting fluid pressure to, and venting it from, either end of said cylinder.

10. The apparatus of claim 9 in which said automatic means include connections from a source of fluid pressure to opposite ends of said cylinder and a valve for controlling said connections.

11. The apparatus of claim 10 in which said valve is controlled by a solenoid, the electrical circuit of which is made and broken by a cam switch driven in synchronism with other moving parts of the apparatus.

12. The apparatus of claim 1 in which the severing means comprise a continuously rotating saw and means for moving said saw to and from the tape bundle.

13. The apparatus of claim 12 in which the saw and an electric motor for driving it are mounted to shift as a unit on guideways inclined with respect to the plane of the top of said table.

14. The apparatus of claim 13 in which the saw unit is shifted to and from the tape bundle, at predetermined times in the cycle, by automatically controlled fluid pressure means.

15. The apparatus of claim 1 in which the means for moving the strip bundle comprise a plurality of pairs of fingers, so arranged that the tape bundle is drawn between the fingers of each pair as it is drawn across the table and lies between said fingers when it is severed to form a strip bundle, and means for shifting said fingers at right angles to the length of the strip bundle.

16. The apparatus of claim 15 in which there are automatic means for moving said fingers toward and away from each other, to grip and release the strip bundle at predetermined points of the cycle.

17. The apparatus of claim 16 in which there are automatic means for projecting said fingers above, and lowering them below, the plane of the top of the table, at predetermined points in the cycle.

18. The apparatus of claim 17 in which the fingers are moved to shift the strip bundle out of the path of the tape bundle, while projected above the table, and returned while retracted below the table.

19. The apparatus of claim 18 in which the fingers of each pair are mounted on members slidable on a horizontal axis below the table and there are provided spring means for moving said members toward each other and fluid pressure means for moving said fingers away from each other.

20. The apparatus of claim 19 in which said members are cylinders closed at both ends and having a limited sliding movement on a tube located below the table.

21. The apparatus of claim 20 in which there is a piston working in each cylinder and fixed to said tube.

22. The apparatus of claim 21 in which there is a spring in each cylinder interposed between the piston and one end of the cylinder.

23. The apparatus of claim 22 in which the tube is provided with parts connecting the interior thereof with that portion of each cylinder between the piston and the end of the cylinder opposite that engaged by the spring.

24. The apparatus of claim 23 in which the tube is carried by a vertically shiftable yoke and means are provided for raising and lowering said yoke at predetermined points of the cycle.

25. The apparatus of claim 24 in which the tube is mounted in said yoke for longitudinal shifting and means are provided for shifting said tube longitudinally in said yoke at predetermined points in the cycle.

26. The apparatus of claim 25 in which means are provided for admitting fluid pressure to, and venting it from, said tube, at predetermined points of the cycle.

27. A strip-forming and feeding apparatus comprising the combination of a frame; a table supported thereby; a support, at one side of the table, on which a plurality of coils of chipboard tape may be mounted side by side for rotation about a common axis; means for gathering tapes from said coils into a tape bundle, in which each tape is disposed edgewise on the surface of the table; means for gripping the free end of said tape bundle during a portion of the cycle, to hold it stationary with respect to the table; reciprocating carriage means for drawing said tape bundle lengthwise across the table; means for severing a portion of the tape bundle to form a strip bundle; and means for moving the strip bundle on said table in a direction perpendicular to the length of said bundle.

28. A strip-forming and feeding apparatus comprising the combination of a frame; a table supported thereby; a support, at one end of the table, on which a plurality of coils of chipboard tape may be mounted side by side for rotation about a common axis; means for gathering tapes from said coils into a tape bundle, in which each tape is disposed edgewise on the surface of the table; means for gripping the free end of said tape bundle during a portion of the cycle, to hold it stationary with respect to the table; means for drawing said tape bundle lengthwise across the table; means for severing a portion of the tape bundle to form a strip bundle; and means for moving the strip bundle on said table in a direction perpendicular to the length of said bundle, said gripping means comprising a pair of outer table jaws and automatic means for moving said jaws toward and away from the bundle, at predetermined points of the cycle.

29. The apparatus of claim 28 in which automatic means are provided for projecting said jaws above, and lowering them beneath the table top, at predetermined points of the cycle.

30. The apparatus of claim 29 in which said table jaws are carried by a slide mounted on the frame for vertical movement with respect to the table.

31. The apparatus of claim 30 in which cam means are provided for lowering said slide.

32. The apparatus of claim 31 in which the cam means comprise an edge cam, bearing on a roller carried by said slide, and means for driving said cam.

33. The apparatus of claim 32 in which spring means are provided for raising said slide.

34. The apparatus of claim 33 in which the jaws are carried by members horizontally slidable on said slide.

35. The apparatus of claim 34 in which two bell cranks are fulcrumed on said slide, each having one arm engaging one of said members, and a spring connects said bell cranks tending to move the members toward each other.

36. The apparatus of claim 35 in which cam means are provided for rocking said bell cranks at a predetermined point of the cycle, against the tension of said spring, to separate said members.

37. A strip-forming and feeding apparatus comprising the combination of a frame; a table supported thereby; a support, at one side of the table, on which a plurality of coils of chipboard tape may be mounted side by side for rotation about a common axis; means for gathering tapes from said coils into a tape bundle, in which each tape is disposed edgewise on the surface of the table; primary gripping means for gripping said tape bundle during a portion of the cycle, to hold it stationary with respect to the table; supplementary gripping means for gripping said tape bundle to hold it stationary with respect to the table; means for drawing said tape bundle lengthwise across the table; means acting between said primary and supplementary gripping means to sever a portion of the tape bundle to form a strip bundle; and means for moving the strip bundle on said table in a direction perpendicular to the length of the bundle.

38. The apparatus of claim 37 in which automatic means are provided for causing said primary and supplementary gripping means to grip the tape bundle after it has been drawn across the table and before severance of a portion thereof.

39. The apparatus of claim 38 in which automatic means are provided for causing said supplementary gripping means to release the strip bundle immediately after severance thereof from the tape bundle.

40. The apparatus of claim 39 in which the primary gripping means include a pair of outer table jaws and the supplementary gripping means include a pair of inner table jaws.

41. The apparatus of claim 40 in which said means for drawing the tape bundle across the table include means for clamping and releasing said bundle at predetermined points of the cycle, and automatic means are provided for projecting the outer table jaws above the table after said clamping means have clamped the bundle and for retracting said outer table jaws below the table after said clamping means have released the strip bundle and again claimped the tape bundle.

42. The apparatus of claim 41 in which the automatic means are such as to cause the primary gripping means to grip the tape bundle just before the clamping means release the strip bundle and to release the tape bundle just after the clamping means again clamp the tape bundle.

43. The apparatus of claim 42 in which automatic means are provided for projecting the inner table jaws above the table before said clamping means release the tape bundle and for retracting said inner table jaws below the table after severance of a portion of the tape bundle to form a strip bundle.

44. The apparatus of claim 43 in which the inner table jaws are caused to grip the tape bundle before said clamping means release it and to release the strip bundle after severance thereof from the tape bundle.

45. A strip-forming and feeding apparatus comprising the combination of a frame; a table supported thereby; a support, at one side of said table, on which a plurality of coils of chipboard tape may be mounted side by side for rotation about a common axis; means for gathering tapes from said coils into a tape bundle, in which each tape is disposed edgewise on the surface of the table; a pair of outer table jaws; a carriage horizontally reciprocable above the table; a pair of carriage jaws mounted in and movable with said carriage; automatic means for causing said carriage jaws to grip and release the tape bundle; means for reciprocating said carriage to draw the tape bundle across the table; means for severing a portion of said tape bundle to form a strip bundle; means for moving the strip bundle on said table in a direction perpendicular to the length of the bundle; and automatic means for causing said outer table jaws to grip the tape bundle before the carriage jaws release it and to release the tape bundle after the carriage jaws have again gripped it.

46. The apparatus of claim 45 in which automatic means are provided for lowering the carriage jaws toward the table before the outer table jaws release the tape bundle and raising the carriage jaws from the table after the outer table jaws have again gripped the tape bundle.

47. The apparatus of claim 46 in which automatic means are provided for projecting the outer table jaws above the table before the carriage jaws release the tape bundle and for retracting the outer table jaws below the table after the carriage jaws have again gripped the tape bundle.

48. The apparatus of claim 47 in which the carriage jaws and the outer table jaws are carried by slides, the one vertically reciprocable in the carriage and the other vertically reciprocable in the machine frame.

49. The apparatus of claim 48 in which the carriage jaws are fixed to members horizontally slidable on a part of the slide mounted on the carriage, and the outer table jaws are fixed to members horizontally slidable on a part of the slide carried by the machine frame.

50. The apparatus of claim 49 in which the slides are shifted, in one direction, by cams acting thereon.

51. The apparatus of claim 50 in which there are two bell cranks fulcrumed on each slide, one arm of each bell crank engaging one of said members, a spring connecting the bell cranks of each pair and tending to move the corresponding members toward each other, and cams acting to rock said bell cranks to separate said members.

52. The apparatus of claim 45 in which there are a pair of inner table jaws, adjacent the outer table jaws, and the severing means act to sever the tape bundle between the outer and inner table jaws.

53. The apparatus of claim 52 in which automatic means are provided for causing the inner table jaws to grip the tape bundle before, and to release the strip bundle after, the severance of the tape bundle to form the strip bundle.

54. The apparatus of claim 53 in which automatic means are provided for projecting the inner table jaws above the table before severance of the tape bundle, and retracting said inner table jaws below the table after such severance.

55. The apparatus of claim 45 in which the means for moving the strip bundle comprise a plurality of pairs of fingers, so arranged that the tape bundle is drawn between the fingers of each pair by the movement of the carriage, and lies between said fingers when it is severed to form a strip bundle, and means for moving said fingers at right angles to the length of the strip bundle.

56. The apparatus of claim 55 in which automatic means are provided for causing said fingers to grip the tape bundle after it has been drawn across the table by the carriage and to release the strip bundle after it has been moved laterally.

57. A strip-forming and feeding apparatus comprising the combination of a table; two supports, one at each side of the table, on each of which a plurality of coils of chipboard tape may be mounted side by side for rotation about a common axis; means at each side of the table for gathering tapes from said coils at that side into a tape bundle, in which each tape is disposed edgewise on the surface of the table; reciprocating carriage means operative to draw each tape bundle, successively, lengthwise across the table from the side at which it is gathered to the opposite side; means for severing a portion of each tape bundle, successively, to form strip bundles; and means for moving the strip bundles on the table in a direction perpendicular to the length of each bundle.

58. A strip-forming and feeding apparatus comprising the combination of a table; two supports, one at each side of the table, on each of which a plurality of coils of chipboard tape may be mounted side by side for rotation about a common axis; means at each side of the table for gathering tapes from said coils at that side into a tape bundle, in which each tape is disposed edgewise on the surface of the table; means operative to draw each tape bundle, successively, lengthwise across the table from the side at which it is gathered to the opposite side; means for severing a portion of each tape bundle, successively, to form strip bundles; and means for moving the strip bundles on the table in a direction perpendicular to the length of each bundle, said means operated to draw each table bundle across the table including a carriage, bundle-gripping means carried thereby, and means for causing said carriage to move to and fro across the table from side to side thereof.

59. The apparatus of claim 58 in which the bundle-gripping means include two bundle-gripping devices, one for each tape bundle, and there are automatic means for causing one of the bundle-gripping devices to grip and release its tape bundle at predetermined points of the cycle and for causing the other bundle-gripping device to grip and release its bundle at different points of the cycle.

60. The apparatus of claim 59 in which there are automatic means for raising and lowering one of said bundle-gripping devices at predetermined points of the cycle and for raising and lowering the other bundle-gripping device at other points of the cycle.

61. The apparatus of claim 60 in which each bundle-gripping device is supported by a slide mounted in the carriage, so as to be vertically shiftable therein, and cam means are provided acting on said slide to raise it.

62. The apparatus of claim 61 in which each bundle-gripping device comprises a pair of jaw members, slidable horizontally on the slide supporting said device; a pair of bell cranks fulcrumed on said slide and each having one arm engaging a jaw member; spring means acting to move said jaw members toward each other; and cam means acting on said bell cranks to separate said jaw members.

63. The apparatus of claim 62 in which the said cam means are edge cams fixed on an internally-splined sleeve journaled in said carriage, and said sleeve is driven by an externally-splined shaft extending above the table from one side thereof to the other, said splined sleeve being slidable on said splined shaft but non-rotatable with respect thereto.

64. A strip-forming and feeding apparatus comprising the combination of a frame; a table supported thereby; two supports, one at each side of the table, on each of which a plurality of coils of chipboard tape may be mounted side by side for rotation about a common axis; means at each side of the table for gathering tapes, from said coils at that side, into a tape bundle, in which each tape is disposed edgewise on the surface of the table; a carriage mounted for reciprocation above the table from one side thereof to the other; bundle-gripping means mounted in the carriage and adapted to grip the free end of one tape bundle when the carriage is at one side of the table, and the free end of the other tape bundle when the carriage is at the opposite side of the table; a link connected to said carriage; fluid pressure means acting on said link to reciprocate the carriage; means for severing a predetermined portion of each tape bundle to form strip bundles; and means for moving the strip bundles successively on said table in a direction perpendicular to the length of said bundles.

65. The apparatus of claim 64 including a cylinder closed at both ends and fixed to said frame; a piston working in said cylinder and fastened to said link; and automatic means for admitting fluid pressure to, and venting it from, either end of said cylinder.

66. The apparatus of claim 65 in which said automatic means include connections from a source of fluid pressure to opposite ends of said cylinder and a valve for controlling said connections.

67. The apparatus of claim 66 in which said valve is controlled by an electromagnet, the electrical circuit of which is made and broken by a cam switch driven in synchronism with other moving parts of the apparatus.

68. The apparatus of claim 57 in which the severing means comprise two continuously rotating saws, one at each side of the table, and means for moving said saws to and from the respective tape bundles.

69. The apparatus of claim 68 in which each saw, and an electric motor for driving it, are mounted to shift as a unit on guideways inclined with respect to the plane of the top of said table.

70. The apparatus of claim 69 in which each saw unit is automatically shifted to and from the corresponding tape bundle, at predetermined times in the cycle, by fluid pressure means.

71. The apparatus of claim 57 in which the means for moving the strip bundles comprise two sets of finger pairs, one for each tape bundle, the finger pairs of each set being so arranged that the corresponding tape bundle is drawn between the fingers of each of said pairs as it is drawn across the table, and lies between said fingers when it is severed to form a strip bundle, and means for successively shifting said sets of finger pairs at right angles to the length of the strip bundles.

72. The apparatus of claim 71 in which there are automatic means for moving the fingers of each finger pair toward each other, to grip the strip bundles at predetermined points of the cycle, and for separating said fingers, the finger pairs of one set gripping the corresponding strip bundle during portions of the cycle in which the finger pairs of the other set are open.

73. The apparatus of claim 72 in which there are automatic means for projecting said finger pairs above and lowering them below the plane of the top of the table, at predetermined points in the cycle, the finger pairs of one set being projected at times when the finger pairs of the other set are lowered.

74. The apparatus of claim 73 in which the finger pairs are moved to shift the corresponding strip bundle out of the path of the tape bundle, while projected above the table, and returned while retracted below the table.

75. The apparatus of claim 74 in which the fingers of each pair are mounted on members slidable on a horizontal axis, below the table, and spring means are provided for moving said members toward each other and fluid pressure means for moving said fingers away from each other.

76. The apparatus of claim 75 in which said members are cylinders closed at both ends and having a limited sliding movement on a tube located below the table.

77. The apparatus of claim 76 in which there is a piston working in each cylinder and fixed to said tube.

78. The apparatus of claim 77 in which there is a spring in each cylinder interposed between the piston and one end of the cylinder.

79. The apparatus of claim 78 in which the tube is provided with ports connecting the interior thereof with that portion of each cylinder between the piston and the end of the cylinder opposite that engaged by the spring.

80. The apparatus of claim 79 in which each tube is carried by a vertically shiftable yoke and means are provided for raising and lowering said yoke at predetermined points of the cycle.

81. The apparatus of claim 80 in which each tube is mounted in the corresponding yoke for longitudinal shifting and means are provided for shifting said tubes longitudinally in said yokes, at predetermined points in the cycle.

82. The apparatus of claim 81 in which means are provided for admitting fluid pressure to, and venting it from, each of said tubes, at predetermined points of the cycle.

83. A strip-forming and feeding apparatus comprising the combination of a frame; a table supported thereby; two supports, one at each side of the table, on each of which a plurality of coils of chipboard tape may be mounted side by side for rotation about a common axis; means, at each side of the table, for gathering tapes, from the coils at that side, into a tape bundle, in which each tape is disposed edgewise on the surface of the table; means, at each side of the table, for gripping the free end of the corresponding tape bundle during a portion of the cycle, to hold it stationary with respect to the table; reciprocating carriage means for drawing successively each tape bundle lengthwise across the table; means for severing a portion of each tape bundle to form strip bundles; and means for moving the strip bundles on said table in a direction perpendicular to the length of said bundles.

84. The apparatus of claim 83 in which the means for gripping comprise two pairs of outer table jaws, one at the right and the other at the left side of the table, and automatic means for moving said left table jaws toward and away from the bundle, at predetermined points of the cycle, and said right table jaws toward and away from the bundle, at different predetermined points of the cycle.

85. The apparatus of claim 84 in which automatic means are provided for projecting said left outer table jaws above, and lowering them beneath, the table top, at predetermined points of the cycle, and for projecting said right outer table jaws above, and lowering them beneath the table top, at different predetermined points of the cycle.

86. The apparatus of claim 85 in which the table jaws of each pair are carried by a slide, mounted on the frame for vertical movement with respect to the table.

87. The apparatus of claim 86 in which cam means are provided for lowering each of said slides.

88. The apparatus of claim 87 in which the cam means comprise edge cams bearing on rollers carried by said slides and means for driving said cams.

89. The apparatus of claim 88 in which spring means are provided for raising said slides.

90. The apparatus of claim 89 in which the jaws of each pair are carried by members slidable horizontally on the corresponding slide.

91. The apparatus of claim 90 in which two bell cranks are fulcrumed on each of said slides, each bell crank having one arm engaging one of said members, and there is a spring connecting said bell cranks and tending to move the members toward each other.

92. The apparatus of claim 91 in which cam means are provided for rocking said bell cranks at predetermined points of the cycle, against the tension of said springs, to separate said members.

93. A strip-forming and feeding apparatus comprising the combination of a frame; a table supported thereby; two supports, one at each side of the table, on each of which supports a plurality of coils of chipboard tape may be mounted side by side for rotation about a common axis; means at each side of the table for gathering tapes, from the coils at said side, into a tape bundle, in which each tape is disposed edgewise on the surface of the table; primary gripping means at each side of the table, one for each of said tape bundles, for gripping it during a portion of the cycle to hold it stationary with respect to the table; supplementary gripping means at each side of the table, one for each of said tape bundles, for gripping it to hold it stationary with respect to the table; means for drawing each of said tape bundles lengthwise across the table, one tape bundle being drawn across the table in one direction and the other tape bundle in the opposite direction; means at each side of the table, acting between the primary and supplementary gripping means at said side of the table, to sever a portion of the corresponding tape bundle to form a strip bundle; and means for moving the strip bundles on said table in a direction perpendicular to their length.

94. The apparatus of claim 93 in which automatic means are provided for causing each of said primary and supplementary gripping means to grip the corresponding tape bundle after it has been drawn across the table and before severance of a portion thereof.

95. The apparatus of claim 94 in which automatic means are provided for causing each of said supplementary gripping means to release the corresponding strip bundle, immediately after severance thereof from the tape bundle.

96. The apparatus of claim 95 in which each of the primary gripping means includes a pair of outer table jaws and each of the supplementary gripping means includes a pair of inner table jaws.

97. The apparatus of claim 96 in which said means for drawing the tape bundles across the table include means for clamping and releasing each of said tape bundles at predetermined points of the cycle, and automatic means are provided for projecting each set of outer table jaws above the table after said clamping means have clamped the corresponding tape bundle, and for retracting each set of outer table jaws below the table after said clamping means have released the corresponding strip bundle and again clamped the corresponding tape bundle.

98. The apparatus of claim 97 in which the automatic means are such as to cause each of the primary gripping means to grip the corresponding tape bundle just before the clamping means release the corresponding strip bundle, and to release said tape bundle just after the clamping means again clamp the tape bundle.

99. The apparatus of claim 98 in which automatic means are provided for projecting each set of inner table jaws above the table before said clamping means release the corresponding tape bundle, and for retracting each set of inner table jaws below the table after severance of a portion of the corresponding tape bundle to form a strip bundle.

100. The apparatus of claim 99 in which each set of inner table jaws is caused to grip the corresponding tape bundle before said clamping means release it, and to release the corresponding strip bundle after severance thereof from said tape bundle.

101. A strip-forming and feeding apparatus comprising the combination of a frame; a table supported thereby; two supports, one at the left and the other at the right side of said table, on each of which supports a plurality of coils of chipboard tape may be mounted side by side for rotation about a common axis; means at each side of the table for gathering tapes, from the coils at said side, into left and right tape bundles, in each of which each tape is disposed edgewise on the surface of the table; two pairs of outer table jaws, one at the left and the other at the right side of the table; a carriage horizontally reciprocable above the table; left and right pairs of carriage jaws mounted in and movable with said carriage; automatic means for causing said left carriage jaws to grip and release the left tape bundle and said right carriage jaws to grip and release the right tape bundle; means for reciprocating said carriage to draw the left tape bundle across the table from left to right and the right tape bundle across the table from right to left; means at each side of the table for severing a portion of each tape bundle to form a strip bundle; means for moving the strip bundles on said table in a direction perpendicular to the length of the bundle; and automatic means for causing said left outer table jaws to grip the left tape bundle before the left carriage jaws release it, and to release said left tape bundle after the left carriage jaws have again gripped it, and for causing said right outer table jaws to grip the right tape bundle before the right carriage jaws release it, and to release the right tape bundle after the right carriage jaws have again gripped it.

102. The apparatus of claim 101 in which automatic means are provided for lowering the left carriage jaws toward the table before the left outer table jaws release the left tape bundle, and raising the left carriage jaws from the table after the left outer table jaws have again gripped the left tape bundle, and for lowering the right carriage jaws toward the table before the right outer table jaws release the right tape bundle, and raising the right carriage jaws from the table after the right outer table jaws have again gripped the right tape bundle.

103. The apparatus of claim 102 in which automatic means are provided for projecting the left outer table jaws above the table before the left carriage jaws release the left tape bundle, and for retracting the left outer table jaws below the table after the left carriage jaws have again gripped the left tape bundle, and for projecting the right outer table jaws above the table before the right carriage jaws release the right tape bundle, and for retracting the right outer table jaws below the table after the right carriage jaws have again gripped the right tape bundle.

104. The apparatus of claim 103 in which each pair of carriage jaws is carried by a slide vertically reciprocable in the carriage, and each pair of outer table jaws is carried by a slide vertically reciprocable in the machine frame.

105. The apparatus of claim 104 in which each carriage jaw is fixed to a member horizontally slidable on a carriage-mounted slide, and each outer table jaw is fixed to a member horizontally slidable on a part of a slide carried by the machine frame.

106. The apparatus of claim 105 in which each of said slides is shifted, in one direction, by a cam acting thereon.

107. The apparatus of claim 106 in which there are two bell cranks fulcrumed on each slide, one arm of each bell crank engaging one of said members, a spring connecting the bell cranks of each pair and tending to move the corresponding members toward each other, and cams acting to rock said bell cranks to separate said members.

108. The apparatus of claim 107 in which there is a pair of left inner table jaws, adjacent the left outer table jaws, and a pair of right inner table jaws adjacent the right outer table jaws, and the severing means act to sever the left tape bundle between the left outer and inner table jaws, and the right tape bundle between the right outer and inner table jaws.

109. The apparatus of claim 108 in which automatic means are provided for causing the left inner table jaws to grip the left tape bundle before, and to release the strip bundle after, the severance of the left tape bundle to form the strip bundle, and for causing the right inner table jaws to grip the right tape bundle before, and to release the strip bundle after, the severance of the right tape bundle to form a strip bundle.

110. The apparatus of claim 109 in which automatic means are provided for projecting the left inner table jaws above the table before severance of the left tape bundle, and retracting said left inner table jaws below the table after such severance, and for projecting the right inner table jaws above the table before severance of the right tape bundle, and retracting said right inner table jaws below the table after such severance.

111. The apparatus of claim 101 in which the means for moving the strip bundles comprise two sets of finger pairs, the left tape bundle being drawn between the fingers of the pairs of one set by the movement of the carriage from left to right, and lying between said fingers when it is severed to form a strip bundle, and the right tape bundle being drawn between the fingers of the pairs of the other set by the movement of the carriage from right to left, and lying between said fingers when it is severed to form a strip bundle, and means for moving said sets of finger pairs successively at right angles to the length of the strip bundles.

112. The apparatus of claim 111 in which automatic means are provided for causing the fingers of one set to grip the left tape bundle, after it has been drawn across the table from left to right by the carriage, and to release the strip bundle severed from said left tape bundle after said strip bundle has been moved laterally, and for causing the fingers of the other set to grip the right tape bundle, after it has been drawn across the table from right to left by the carriage, and to release the strip bundle severed therefrom after it has been moved laterally.

PAUL S. SMITH.

REFERENCES CITED

The following references are of record in the file of this patent:

UNITED STATES PATENTS

| Number | Name | Date |
| --- | --- | --- |
| 639,272 | Newton | Dec. 19, 1899 |
| 2,021,064 | Heygel | Nov. 12, 1935 |